US009258687B2

(12) United States Patent
Smith

(10) Patent No.: US 9,258,687 B2
(45) Date of Patent: Feb. 9, 2016

(54) METHOD AND SYSTEM FOR PROVIDING TIERED ACCESS TO COMMUNICATION NETWORK RESOURCES

(71) Applicant: Rivada Networks LLC, Arlington, VA (US)

(72) Inventor: Clint Smith, Warwick, NY (US)

(73) Assignee: RIVADA NETWORKS LLC, Colorado Springs, CO (US)

(*) Notice: Subject to any disclaimer, the term of this patent is extended or adjusted under 35 U.S.C. 154(b) by 495 days.

(21) Appl. No.: 13/664,819

(22) Filed: Oct. 31, 2012

(65) Prior Publication Data

US 2013/0072146 A1 Mar. 21, 2013

Related U.S. Application Data

(63) Continuation-in-part of application No. 13/545,566, filed on Jul. 10, 2012, now Pat. No. 8,557,817, which is a continuation of application No. 12/273,146, filed on Nov. 18, 2008, now Pat. No. 8,275,349.

(60) Provisional application No. 60/990,938, filed on Nov. 29, 2007, provisional application No. 61/032,010, filed on Feb. 27, 2008, provisional application No. 61/038,451, filed on Mar. 21, 2008.

(51) Int. Cl.
| H04M 11/04 | (2006.01) |
| H04W 4/22 | (2009.01) |
| H04W 72/12 | (2009.01) |
| H04W 76/00 | (2009.01) |
| H04W 72/00 | (2009.01) |
| H04W 88/06 | (2009.01) |

(52) U.S. Cl.
CPC ............ *H04W 4/22* (2013.01); *H04W 72/1247* (2013.01); *H04W 76/007* (2013.01); *H04W 72/00* (2013.01); *H04W 88/06* (2013.01)

(58) Field of Classification Search
CPC . H04W 4/22; H04W 72/1247; H04W 76/007; H04W 72/00
USPC ........................................ 455/404.1; 370/338
See application file for complete search history.

(56) References Cited

U.S. PATENT DOCUMENTS

| 6,650,619 B1 | 11/2003 | Schuster et al. |
| 2005/0074012 A1* | 4/2005 | Garakani et al. ......... 370/395.21 |
| 2007/0004421 A1 | 1/2007 | Chambers et al. |
| 2007/0139182 A1 | 6/2007 | O'Connor et al. |
| 2007/0177510 A1* | 8/2007 | Natarajan et al. ............. 370/238 |
| 2007/0254623 A1 | 11/2007 | Branda et al. |

(Continued)

*Primary Examiner* — Marcos Batista
(74) *Attorney, Agent, or Firm* — The Marbury Law Group, PLLC

(57) ABSTRACT

Methods and systems automatically allocate cellular communication network resources to emergency response personnel during emergency situations which are detected by call volumes exceeding a predetermined maximum. Access to cellular communication network resources is provided by dedicating a portion of communication radio resources to emergency response personnel use. By reserving radio resources for emergency communication purposes, emergency personnel are able to both initiate and receive calls or data sessions from both other mobile devices as well as conventional landline telephone stations. Qualified emergency response personnel can preregistered their phones and be assigned personal identification numbers to enable access to allocated network resources. Users can also be registered "on the fly."

12 Claims, 20 Drawing Sheets

(56) References Cited

U.S. PATENT DOCUMENTS

| | | |
|---|---|---|
| 2007/0275690 A1 | 11/2007 | Hunter et al. |
| 2008/0010674 A1 | 1/2008 | Lee |
| 2008/0081637 A1* | 4/2008 | Ishii et al. .................... 455/453 |
| 2008/0102853 A1* | 5/2008 | Kagimoto et al. ............ 455/453 |
| 2008/0186852 A1* | 8/2008 | Sami et al. ................... 370/235 |

* cited by examiner

METHOD AND SYSTEM FOR PROVIDING TIERED ACCESS TO COMMUNICATION NETWORK RESOURCES

RELATED APPLICATIONS

This application is a continuation in part of U.S. patent application Ser. No. 13/545,568 entitled "Method and System for Providing Tiered Access to Communication Network Resources" filed on Jul. 10, 2012, which is a continuation of U.S. patent application Ser. No. 12/273,146 entitled "Method and System for Providing Tiered Access to Communication Network Resources" filed on Nov. 18, 2008 that issued as U.S. Pat. No. 8,275,349, which claims the benefit of priority to U.S. Provisional Patent Application No. 60/990,938 filed Nov. 29, 2007, U.S. Provisional Patent Application No. 61/032,010 filed Feb. 27, 2008, and U.S. Provisional Patent Application No. 61/038,451 filed Mar. 21, 2008, the entire contents of each of which are hereby incorporated by reference for all purposes.

FIELD OF THE INVENTION

The present invention relates generally to cellular telephone technologies and more particularly to a system and method for providing emergency response personnel tiered priority access (TPA) to cellular communication network resources.

BACKGROUND

The popularity of cellular communication devices has dramatically increased in recent years. This increase in popularity is due in large part to the advancement of technology and the decreasing cost of equipment and services. Many, if not most, people own or use a mobile device with cellular communication capability on a daily basis. As a result of the growing customer base, cellular communication service providers have responded by dramatically increasing their infrastructure and network coverage so as to support the increased demand.

Cellular communication service providers have endeavored to improve their cellular communication networks by increasing bandwidth to accommodate the increasing number of cellular communication customers. Nevertheless, there is still not enough bandwidth to accommodate every mobile device user at the same time. Indeed, the cellular communication network's basic design is premised on the assumption that not every mobile device user will attempt to access the cellular communication network at the same time. Thus, cellular communication networks are sized and deployed to accommodate a subset of mobile device users at any given moment. In other words, cellular communication networks are not intended to permit every mobile device user to access the network at the same time. Instead, service providers assume that only a relatively small percentage of its mobile device users use the cellular communication network at the same time.

Ordinarily, service provider assumptions are correct and cellular communications networks accommodate all mobile device users. However, events can sometimes prompt people to reach for their mobile devices at the same time, overloading the network's capacity. For example, if an accident occurs during rush hour, a dozen witnesses may call the police at the same time to report the accident, while the resulting traffic delay prompts hundreds of others to call the office, their families or their appointments to say they will be late. In instances where the number of subscribers accessing the cellular communication network exceeds the network's capacity, some subscribers may be denied service and callers trying to reach subscribers within the overloaded cell zone will receive a message to the effect that "all circuits are busy, try again later."

In most everyday instances, the average mobile device call is truly not urgent. As such, it is normally only a minor inconvenience when a mobile device call is not connected through on the first attempt. However, this may not be true for all mobile device calls. For example, emergency response personnel attempting to respond to a traffic accident may need to send and receive mobile device calls in order to render assistance. In such cases and for such users the reliability of their mobile devices may literally be a matter of life and death. Yet it is human nature to reach for the mobile device in an emergency situation, the very instant when emergency responders need reliable communications. Thus, cellular communication networks should be able to provide emergency response personnel with reliable cellular communications even when heavy call volume exceeds the capacity of the cellular communication network.

One response to this need is Wireless Priority Access (WPA) which provides emergency response personnel with priority access to commercial cellular communication networks during times of emergency. In order to use WPA, emergency response personnel must pre-register their mobile devices with their cellular communication network service provider. Then, if the pre-registered emergency response personnel user is unable to access the cellular communication network because of increased call volume, the user may dial *272+Destination Number and push the SEND key (Example: *272 703 650 0100+SEND). The cellular communication network equipment will recognize the *272 prefix as a WPA access request and search a database for the mobile device's unique identification number to confirm that the mobile device is entitled to priority access. If the mobile device is properly authorized, the call will be given priority in the network queue, enabling the user to complete the call.

The WPA system is not without its problems, however. For one, WPA is meant only for key leadership personnel and their direct supporting staff who are in national security and emergency response leadership positions. In order to be authorized for WPA, the mobile device must belong to/be in control of a user who is one of the following: 1) Executive Leadership and Policy Makers; 2) Disaster Response/Military Command and Control; 3) Public Health, Safety, and Law Enforcement Command; 4) Public Services/Utilities and Public Welfare; and 5) Disaster Recovery. Further, a WPA authorized user's position in the call queue will depend on the user's position in the hierarchy above.

From the listing above, it can be seen that WPA is unavailable to most emergency response personnel. As a result many "on the ground" emergency personnel may be left without cellular communication access just as if they are members of the general public. Yet the emergency personnel who are the first to respond to an emergency situation are the ones who need reliable communication access the most. Thus, WPA fails to satisfy the most common and likely situations in which preferred access to cellular communications networks is required.

Another problem with WPA is that the system only provides one way access to cellular communication networks. That is to say, WPA only allows authorized mobile devices to place a call in times of increased call volume by placing its call request ahead in the queue. Those trying to call an authorized mobile device will hear that the networks are busy.

Additionally, the priority access in the queue only insures that a call initiated by the WPA authorized mobile device to a landline based telephone stations, denying use of mobile devices for coordination of on-site personnel. These limitations undercut the value of mobile devices as ubiquitous mobile communications devices.

SUMMARY

The various embodiment methods and systems automatically provide emergency response personnel with tiered priority access to cellular communication networks during situations that create periods of increased call volume. Embodiments disclosed herein provide access to cellular communication network resources by dedicating a portion of communication channels to emergency response personnel. Access to the cellular communication network resources may be provided to both initiate and receive calls from other mobile devices as well as conventional landline telephone stations. Emergency response personnel who have not pre-registered for such access may obtain such emergency access "on the fly." Further, embodiment systems and methods may demobilize cellular communication network resources as an emergency situation is alleviated and call volume returns to normal levels.

BRIEF DESCRIPTION OF THE DRAWINGS

The accompanying drawings, which are incorporated herein and constitute part of this specification, illustrate exemplary embodiments of the invention. Together with the general description given above and the detailed description given below, the drawings serve to explain features of the invention.

DETAILED DESCRIPTION

Figure 1:
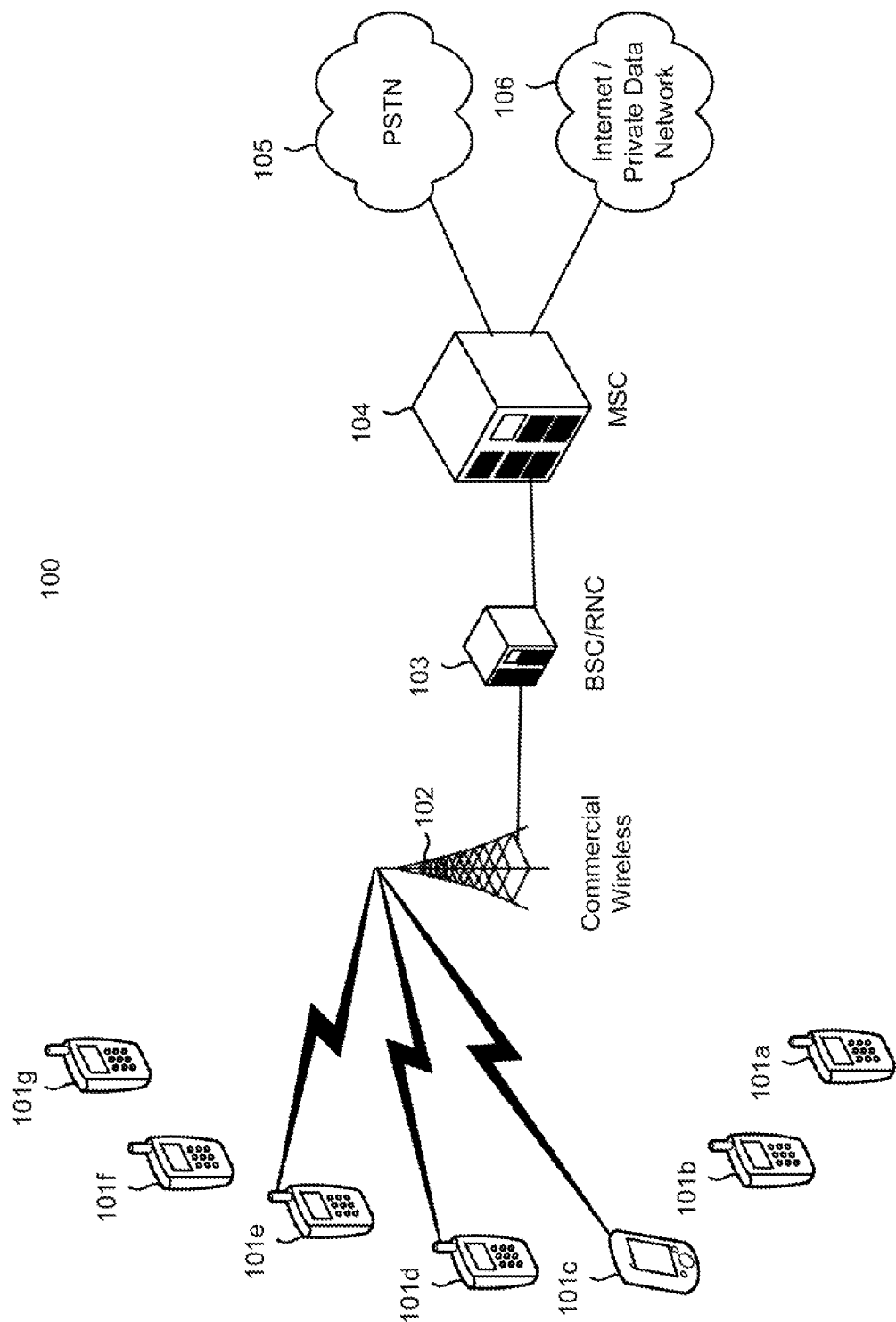
FIG. 1 is a system block diagram illustrating call volume requests made to a cellular communication network under normal conditions.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

As used herein, the term "mobile device" refers to any one of various cellular telephones, personal data assistants (PDA's), palm-top computers, laptop computers with wireless modems, wireless electronic mail receivers (e.g., the Blackberry® and Treo® devices), smartphones, multimedia Internet enabled cellular telephones (e.g., the iPhone®), and similar personal electronic devices. A mobile device may include a programmable processor and memory. In a preferred embodiment, the mobile device is a cellular handheld device (e.g., a mobile device), which can communicate via a cellular telephone communications network.

As used in this application, the terms "component," "module," "engine," "manager" are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, a computer, a server, network hardware, etc. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), public switched telephone network (PSTN), Wi-Fi Protected Access I & II (WPA, WPA2), Bluetooth®, integrated digital enhanced network (iden), and land mobile radio (LMR). Each of these technologies involves, for example, the transmission and reception of voice, data, signaling and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

A high priority in responding to any emergency or disaster situation is establishing effective communications. In large scale emergency or disaster (both manmade and natural) situations, it is paramount to maintain communications between all first responders and emergency personnel in order to respond, manage, and control the emergency situation effectively. In the absence of effective communication among first responders and other emergency personnel, resources may not be effectively mobilized to the areas which need the resources most. Even in minor emergency situations (e.g., traffic accidents and fires), first responders must be able to call on support assets and coordinate with other services (e.g., public utilities, hospitals, etc.).

With the ubiquity of mobile device ownership and usage, emergency communication via mobile devices using commercial cellular communication networks often are the most efficient and effective means to mobilize emergency response personnel and resources. Enabling mobile devices to provide effective emergency communications obviates the technical challenges and expense of coordinating radio frequencies among various first responder agencies (e.g., police, fire, ambulance, FEMA, public utilities, etc.). Also, qualified first responders to an accident who are off duty or not ordinarily equipped with radios (e.g., doctors, nurses, retired police, or military personnel) will have or can quickly borrow a mobile device.

Emergency communications over cellular communication networks is not without problems, however. As discussed above, cellular communication networks ("networks") are designed to accommodate access requests from only a fraction of the total number of mobile devices in a particular cell. At times of emergency or crisis, network resources may become overtaxed when predictable human responses to the situation prompt an extraordinary number of mobile device users within a particular cell to access the network at the same time. Mobile device users may be attempting to alert emergency personnel of the emergency situation (such as a 911 emergency call) or to alert friends or family members that the user is safe despite being in the area of an emergency situation. Some users may be transmitting images of the emergency condition (fire, accident, etc.) to news services or friends. In a wide scale situation, emergency responders using mobile devices for emergency communications will add to the call volume. Regardless, the predictable increase in call volume during an emergency situation can overwhelm a commercial cellular communications network, particularly in the cell zone encompassing the emergency, thus rendering the network unreliable for emergency response personnel communication usage.

To illustrate the problem, consider the case of a traffic accident occurring on the highway. FIG. 1 illustrates a cellular communication network under normal conditions. As illustrated, multiple mobile devices 101(a-g) are wirelessly connected to the cellular communication network via a base station 102 servicing a particular cell 100. The base station 102 connects via a base station controller (BSC)/radio network controller (RNC) 103 to a Mobile Switching Center (MSC) 104. The MSC 104 contains both a public switched telephone network (PSTN) interface and an internet interface. Calls made to and from any of the multiple mobile devices 101(a-g) may be routed via conventional landlines over the PSTN 105 or Internet 106 using Voice Over Internet Protocol (VOIP). Calls between conventional landline telephone stations and any one of mobile devices 101(a-g) may be routed over via the PSTN or Internet 106. Calls between mobile devices 101(a-g) may be routed over the PSTN or Internet 106 to similar MSC 104, BSC/RNC 103, and base station 102 located near the initiating or intended mobile device 101(a-g).

FIG. 1 illustrates the typical situation in which a fraction of the mobile devices within a cell access the network at the same time. For example, FIG. 1 shows seven separate mobile devices 101(a-g) located within the cell, only three of which (101c, 101d, and 101e) are currently accessing the network. Thus, the network is operating well within its operating parameters and all requests to the network from mobile devices 101(a-g) are granted. It is noted that all mobile devices 101(a-g) that are turned on but not in use continue to communicate with the base station 102 via a link management channel (not illustrated). The network uses these communications to keep track of the mobile devices 101(a-g) within each cell to support call routing. However, the amount of information communicated between all mobile devices 101(a-g) and the base station 102 for such tracking purposes is small (particularly in contrast to the bandwidth required for a normal telephone call), so the number of on-but-inactive mobile devices 101 within a cell normally will not overwhelm the network.

Figure 2:
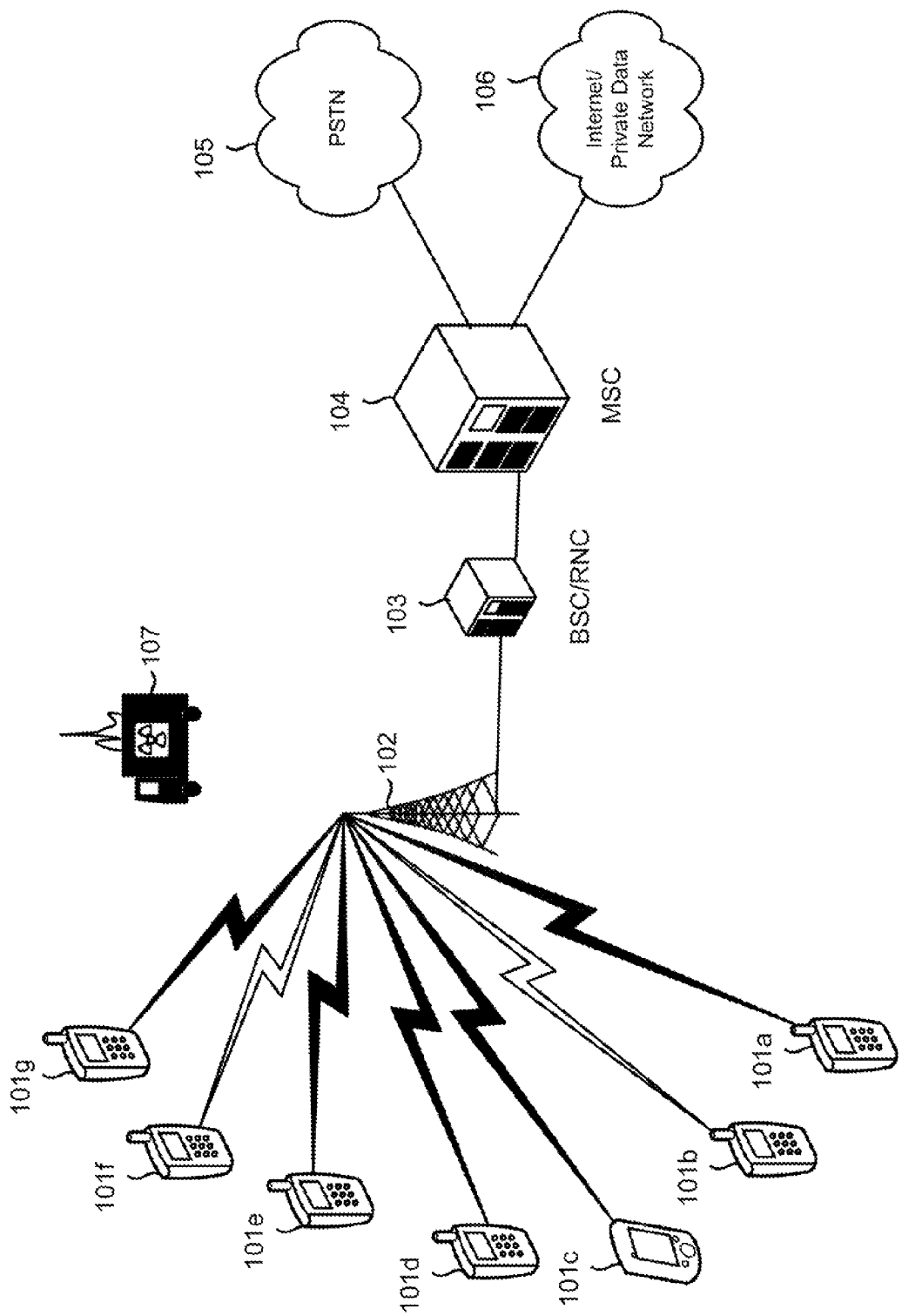
FIG. 2 is a system block diagram illustrating call volume requests made to a cellular communication network under an emergency situation condition.

This normal functioning of the cellular network can be disrupted when, for example, an accident stops traffic, prompting delayed drivers to simultaneously use their mobile devices to alert emergency personnel of the traffic accident (e.g., emergency 911 call, etc.) or contact friends, family members, business associates, etc., to inform them of the delay. FIG. 2 illustrates a cellular communication network in such an emergency situation. In this illustration, a truck 107 in the vicinity of base station 102 is on fire. Predictably, the truck 107 fire prompts most of the mobile devices 101(a-g) users within the vicinity to access the cellular network at approximately the same time. This causes an overload condition in the cell by exceeding the bandwidth of the carriers on the local base station 102. Consequently, some of the mobile devices 101b, 101f will not be granted access to the network, and new network access requests may be denied until communication channels open up. This communication bottleneck may worsen the emergency situation by delaying the response by emergency personnel and denying first responders with effective communication over the network.

This problem is exacerbated in disaster situations involving many victims and large areas, such as wildfires, floods, hurricanes, tornadoes and terrorist attacks. As witnessed during the September 11th attack and Hurricane Katrina, large disasters can destroy part of the cellular and landline telephone network infrastructure, leaving the remaining network more vulnerable to overload conditions. Network overloads during disaster events are particularly troublesome since such situations naturally involve widespread confusion and require close coordination among a large number of emergency and relief personnel.

If a disaster situation will persist long enough (e.g., a flood or hurricane situation), additional cellular communication capacity can be added to a region by activating a deployable cellular communication system to provide emergency response teams and personnel with the ability to communicate. Such recently developed deployable units, referred to herein as a "switch on wheels," can include a CDMA2000 base station and switch, Land Mobile Radio (LMR) interoperability equipment, a satellite Fixed Service Satellite (FSS) for remote interconnection to the Internet and PSTN, and, optionally, a source or remote electrical power such as a gasoline or diesel powered generator. A more complete description of an example deployable switch on wheels is provided in U.S. patent application Ser. No. 12/249,143, filed Oct. 10, 2008, the entire contents of which is hereby incorporated by reference in their entirety.

These switch on wheels are effectively mobile cellular base stations which may be deployed in a disaster area and operate as a cellular tower antenna. The switch on wheels sends and receives communication signals from a plurality of mobile devices 101 and serves as a gateway portal to the rest of the conventional communications infrastructure. Communications between the switch on wheels and a mobile device 101 is broken down into packets for transport as a VOIP communication, and then transmitted via satellite to a ground station outside the disaster area from which the call is forwarded through the telephone network to the recipient. Even with the added bandwidth provided by deployable switch on wheels, network overloads may still cause communication delay and frustration to emergency response personnel.

To overcome such problems in the event of a national emergency, the Wireless Priority Access (WPA) system was developed. Conventional WPA systems provide selected emergency leadership with preemptive access to cellular communication networks. However, conventional WPA systems do not permit calls made to the mobile device of a registered WPA authority. In other words, while mobile devices registered for WPA service may be given priority access for placing calls on the network, there are no provisions in the WPA system enabling those very same mobile devices to receive calls. Incoming calls to mobile devices in a command center may be just as important as outgoing calls. Also, conventional WPA systems assume that if an authorized user needs to make a call, the call will be made from their pre-registered mobile device. However, there may be instances where the authorized personnel do not have their pre-registered mobile device or that mobile device has been damaged. Provisions must be made to enable the authorized personnel access to an overloaded network. Also, emergency personnel who have not previously registered their mobile device on the WPA system cannot access overloaded cellular communication networks "on the fly." Many times, off duty, junior, volunteer emergency response personnel may be the first responders on the scene on an incident. Such personnel may not be entitled to conventional WPA, which is designed to address the needs of the leadership. Thus, precisely the personnel who can quickly alleviate a situation given their proximity on the scene are likely not pre-registered and authorized for conventional WPA.

To overcome these limitations with conventional cellular communication networks and conventional WPA, the various embodiments provide Tiered Priority Access (TPA) capabilities to deliver Quality of Service (QoS)/Grade of Service (GOS) mobile device communications for first responders for calls both originated and terminated at a mobile handset. The various embodiments are particularly aimed at the needs of first responders at the very start of an emergency event.

TPA, as its name implies, aims to provide a tiered response to network capacity requirements. The tiered response mirrors typical communication requirements at the incident scene as more responders appear to help resolve the problem (s) at hand. When an incident occurs, first responders are either at the incident scene or begin to respond. First responders reporting to an incident initially arrive on scene in small numbers and then grow in direct response to the magnitude and severity of the incident.

To accommodate this predictable response, TPA enables an escalation and de-escalation process based upon call volume as first responders arrive on scene and then depart as the situation is restored to normal.

In overview, the various embodiments work as follows. During normal operation, cellular call volume through particular base stations is monitored to determine whether the network is reaching capacity limits. Call volume may be monitored based on current calls, attempts to access the network, engaged bandwidth, or other methods known to cellular service providers. Call volume may be locally monitored at the base station 102, at a BSC/RNC 103, or an MSC 104 or, in an embodiment, centrally, such as in a Network Operation Center (NOC). Such monitoring is at the cellular level, since normal emergency situations are most likely to impact one or two cell zones, although TPA will work in a similar fashion in the event of a widespread emergency. When call volume in a cell exceeds a threshold value preselected by the service provider and/or emergency response planners, the system allocates one channel in the affected cell tower to TPA operation. FIG. 2 illustrates a situation in which call volume has exceeded a threshold indicating that TPA should be implemented. As shown in FIG. 2, more mobile devices 101 in the cell supported by the base station 102 are attempting to access the network than the network can connect. As a result, only some of the mobile devices 101a, 101c, 101d, 101e and 101g will be able to place or receive calls (shown as solid black lightning bolts), while others will be denied access to the network (shown as white lightning bolts). In this situation, call volume within the cell served by the base station 102 has exceeded the threshold, so one of the communication channels on the antenna will be allocated to TPA operation. However, the channel remains available to general public use until a TPA-authorized call is placed. Thus, no change in the communication network is shown in FIG. 2.

Figure 3:
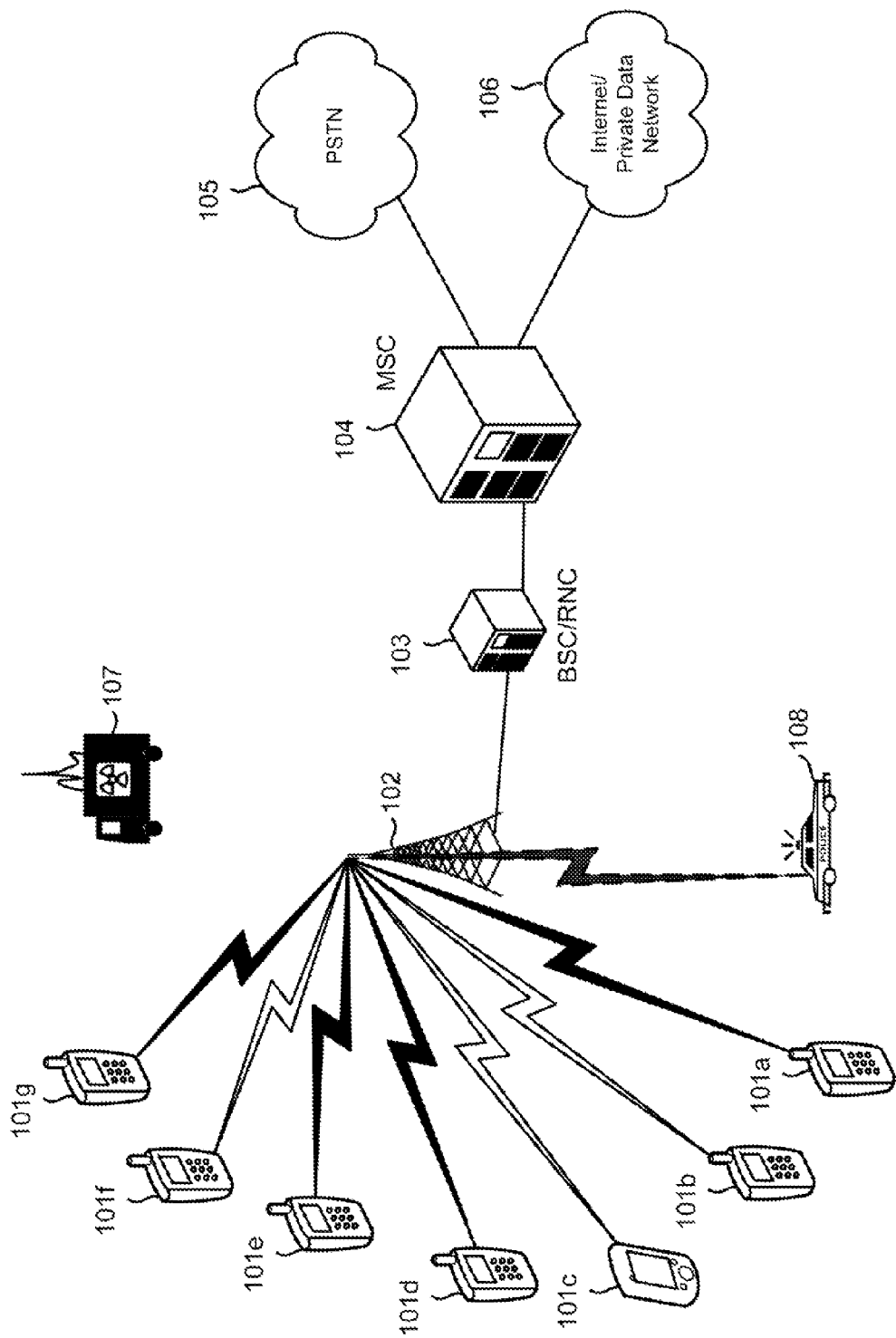
FIG. 3 is a system block diagram illustrating call volume requests made to a cellular communication network under an emergency situation condition when a first responder arrives on the scene.

The various embodiments address this overload condition in order to allow emergency personnel to use the cellular communication network as they arrive on scene, as is illustrated in FIG. 3. When an emergency responder 108 arrives on scene, that individual may initiate a wireless telephone call. If a communications channel has been allocated to TPA operation and the emergency responder's mobile device is pre-registered as a TPA-authorized mobile device, the network can recognize the pre-registered TPA-authorized mobile device from the mobile device's unique ID and recognize the call as a TPA call. The base station 102, BSC/RNC 103 or the MSC 104 then ensure the TPA call is connected. If necessary, the bandwidth allocated to civilian mobile device users is reduced and one or more non-emergency calls may be dropped to enable the TPA call to be connected. This is illustrated in FIG. 3 as the connection to mobile device 101c has been dropped and denied further access to the network (illustrated as a white lightning bolt), and the TPA call (illustrated as a dashed black lightning bolt) by the emergency responder 108 is connected.

Figure 4:
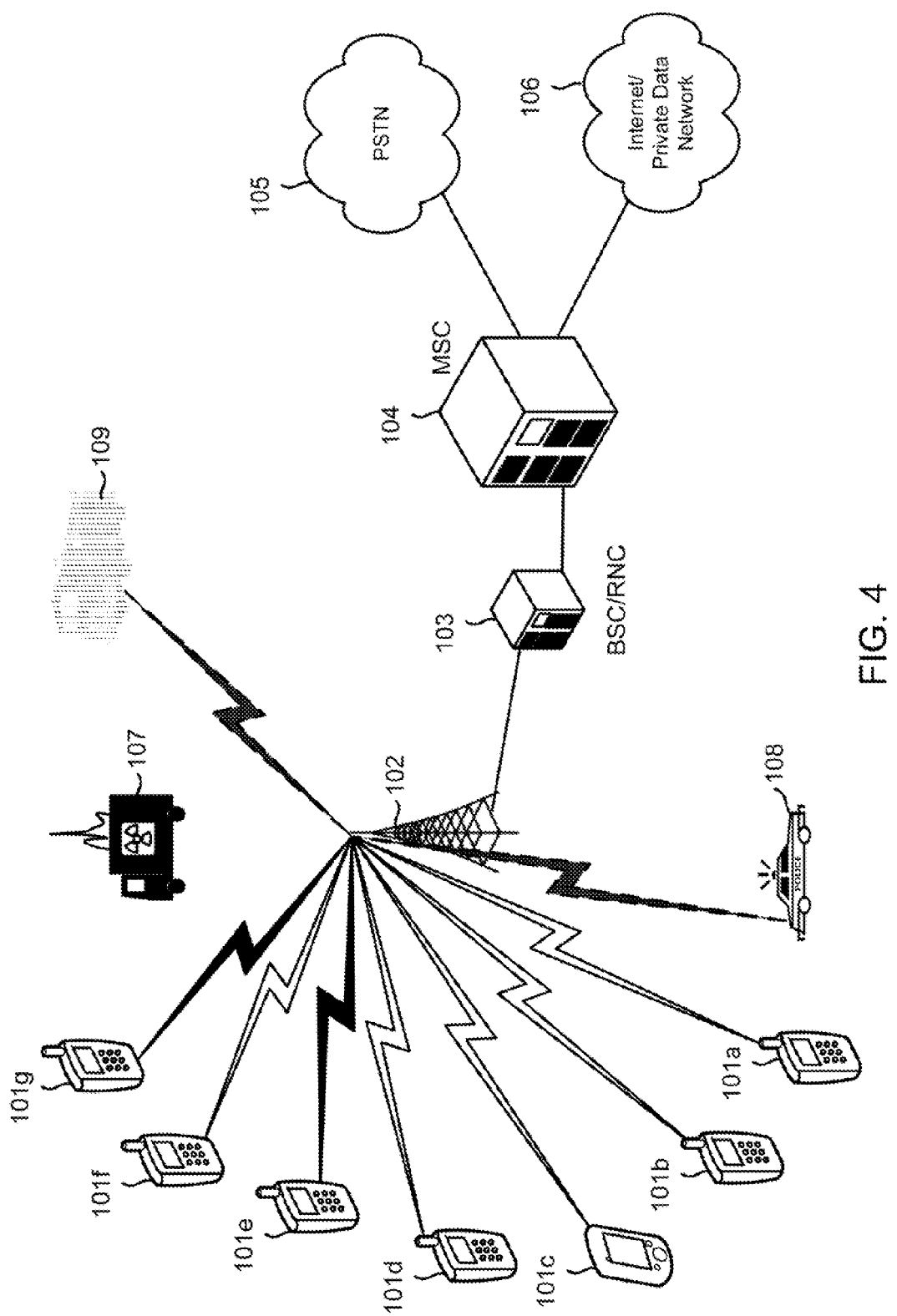
FIG. 4 is a system block diagram illustrating call volume requests made to a cellular communication network as additional emergency response personnel arrive on the scene.

As additional emergency personnel 109 arrive on scene of the emergency, additional TPA calls may need to be connected as illustrated in FIG. 4. To accommodate the increase in TPA calls, additional network resources may be automatically allocated to TPA operation in order to provide emergency responders reliable cellular communications. This is illustrated in FIG. 4 which shows connected TPA calls with police 108 and fire 109 personnel (illustrated as a dashed black lightning bolts), while mobile devices 101c and 101d have been disconnect (illustrated as a white lightning bolts). Automatically allocating more resources to TPA use reduces the bandwidth available to the general public, which will limit general access to the network. However, emergency personnel are provided reliable access to the network so long as the heavy call volume persists.

Figure 5:
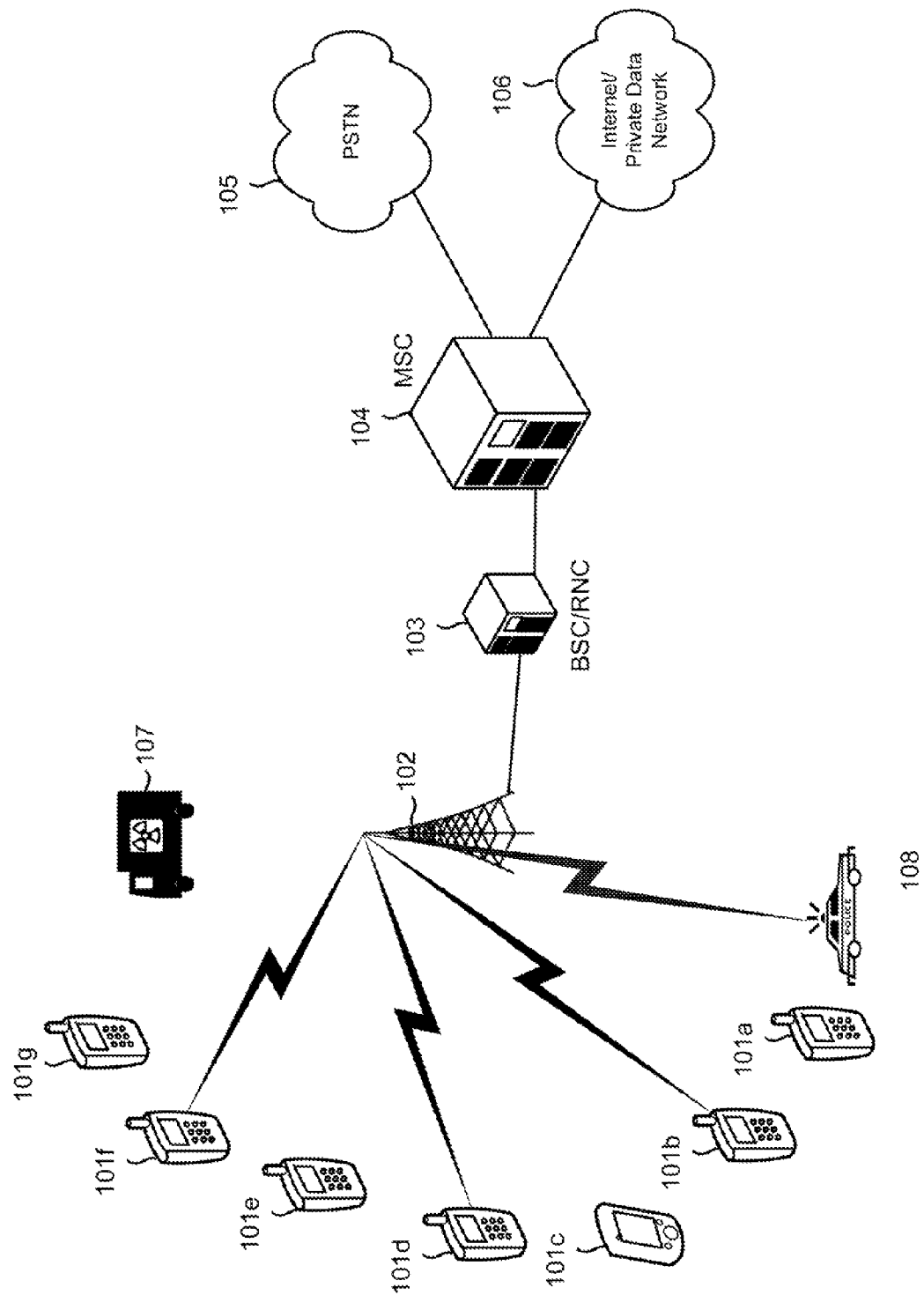
FIG. 5 is a system block diagram illustrating call volume requests made to a cellular communication network after an emergency situation has been alleviated.

Eventually the emergency situation will be resolved and emergency personnel will begin to leave the scene. As conditions return to normal, civilian call volume should return to normal levels while the number of emergency responders requiring TPA-access will also decline. This is illustrated in FIG. 5 which shows that the fire has been extinguished and firemen have left the scene. As traffic begins returning to normal flow fewer general population mobile devices 101(a-g) access the network simultaneously. With cellular communications returning to normal, cellular communications resources may be released from TPA operations, restoring the network to normal operations. As illustrated, the remaining emergency personnel 108 are connected to the cellular communication network in the normal fashion as the call volume has decreased to the point that TPA operation has been terminated.

When TPA operation is implemented on one or more communication channels, the cellular system (e.g., locally in the base station, BSC/RNC, or MSC, or in a central location such as a NOC) monitors incoming and outgoing calls to determine whether any calls are coming from or directed to emergency response personnel. This may be accomplished by recognizing an originating or destination mobile device as being TPA pre-registered mobile device. Alternatively, the system may recognize emergency response personnel when they complete a special dialing procedure such as the *272 dialing procedure described below.

Mobile devices can be pre-registered for TPA use by authorized users. This may be accomplished by registering as a qualified emergency responder (e.g., according to criteria established by governmental authorities) with the cellular network provider. As is well known in the telecommunications art, all mobile devices 101 which access the cellular communication are assigned a unique identification number. In the pre-registration process, the cellular network provider stores the mobile device's unique identification number in a database of authorized TPA personnel. The cellular network provider may also issue the individual a unique Personal Identification Number (PIN) for use in implementing TPA preemption from a non-TPA mobile device as described more fully below.

If the emergency responder's mobile device is not pre-registered (such as a borrowed phone), and the network is overload, the emergency responder may be unable to access network resources. In this situation, the emergency responder can activate the embodiment TPA from a non-registered mobile device 101 by first dialing *272 followed by a personal identification number (PIN) and the telephone number. The nearest base station 102 to the non-registered mobile device 101 receives the transmission from the mobile device 101 indicating that the mobile device is initiating a call. The base station 102 (or BSC/RNC 103 connected to the receiving base station) recognizes the *272 special dialing prefix and starts to route the call to the appropriate destination. Alternatively, recognition and routing of the #272 dialing prefix may be accomplished at the MSC 104. This destination may be the closest Public Safety Answering Point (PSAP) or central location with a database of PINs. The *272 call is similarly processed at the BSC/RNC 103 and later MSC 104 as the call proceeds through the communication network system. The BSC/RNC 103 and MSC 104 controlling the base station antenna 102 and other associated antennae are programmed to recognize the special dialing procedure using a database of pre-registered first responder PINS. This PIN database may be stored at the MSC 104 or at another central location such as a NOC. If the received PIN matches a record in the PIN database, the MSC 104 may immediately give the caller preemptive access to the network just as if the call had been made from a TPA-registered mobile device as described above. In order to support this capability, a TPA-allocated channel reserves sufficient open capacity during TPA-operation to receive and recognize *272 dialed calls. If the communication channel is at capacity and a dialed number does not begin with *272, the call is promptly dropped with no attempt to complete the call. However, if the dialed number begins with *272, the MSC 104 completes the process of comparing the entered PIN to the PIN database and temporarily registering the call as a TPA-authorized mobile device. Non-TPA calls may be dropped if necessary in order to retain sufficient capacity to receive and recognize *272 calls.

While reference is made throughout the application to the MSC 104 monitoring and providing the TPA capability, it should be appreciated by one of skill in the art that other elements of the communication system may implement the various method operations. These elements may include, but are not limited to equipment collocated with the base station antenna 102, the BSC/RNC 103, or a NOC.

Once a mobile device has been recognized as a TPA-phone by means of the *272 dialing procedure, the MSC 104 will track the mobile device and continue to treat it as if it were a TPA-registered mobile device so long as at least one communication channel is allocated to TPA operation. Using the unique identification number assigned to the mobile device, the MSC 104 will recognize subsequent calls from the mobile device as TPA-calls without the need for the user to repeat the *272 dialing procedure. Similarly, the MSC 104 can identify incoming calls to the first responder that should receive TPA preemption service. Thus, a first responder 108 using a non-registered mobile device can register the mobile device "on the fly" when TPA is implemented for both incoming and outgoing calls by using the *272 dialing procedure to call one number (such as a dispatcher or "911").

In an embodiment, a TPA authorized user with a PIN can authenticate any number of mobile devices using the *272 dialing procedure described above. This embodiment will enable first responders, such as a policeman, fireman or emergency medical technician, to "deputize" volunteers, such as military personnel, doctors or retired policemen that they find on the scene, thus creating a reliable ad hoc emergency communication network. Since the temporary TPA-authorization of a mobile device established by the *272 dialing procedure is rescinded as all communication channels in the affected area return to normal operation (i.e. cease TPA operation), there is limited concern that the TPA system could be compromised for subsequent emergencies provided the authorized user's PIN is not revealed. Even if the PIN is revealed, the PIN can be easily changed without significant impact since TPA implementation is expected to be an infrequent, random and episodic event.

In a further embodiment, a user of a TPA-registered mobile device who does not have (or forgot) a PIN can register another phone "on the fly," thereby "deputizing" it for the duration of the TPA event by simply initiating the special dialing procedure on any mobile device. For example, the first responder may use a TPA-registered mobile device to dial the number of the mobile device to be "deputized" followed by *272 (any dialing prefix or postscript may be used). When this call is received by the MSC 104, the *272 prefix or postscript is recognized as indicating that the dialed number is to be treated as a temporary TPA-authorized mobile device, allowing it to store the unique ID of the called mobile device in a database for tracking such temporary TPA authorizations. Using this capability, a first responder can quickly deputize one or more volunteers simply by calling their numbers.

In still a further embodiment, emergency response personnel whose position does not rise to the level of qualifying for pre-registration TPA service or PIN may still be the first emergency personnel on the scene of an emergency situation. The user may use his/her non pre-registered mobile device to initiate a *272 special dialing procedure. The call may be forwarded to a PSAP which may issue a temporary PIN and add the mobile device to the database of temporary TPA authorizations.

Alternatively, if the user initiates a *272 special dialing (or similar dialing procedure such as 911), the call may be forwarded to a PSAP. In large scale crisis situations, the answering PSAP may be disabled or unable to answer quickly due to the large incoming call volume. In such situations, if the *272 call is not answered by the PSAP within a predetermined timeframe, a temporary TPA authorization may be automatically issued. Since the circumstances surrounding the issuance of the temporary TPA authorization have not been fully analyzed by a PSAP operator, it is unclear whether the user receiving the temporary TPA authorization is properly authorized. Accordingly, the temporary TPA authorization may be flagged on the PSAP monitor for possible deactivation.

In a further embodiment, the cellular network is configured to give calls from a TPA-registered mobile device and (optionally) temporary TPA-authorized mobile devices priority when dialing to a civilian (i.e., non-TPA authorized) mobile device within the cell zone(s) implementing TPA operations. When such a call is made, the MSC 104 is programmed to route the call to the dialed mobile device through the communication channel or channels allocated to TPA operation. If a TPA-allocated channel is at capacity when the call from a TPA-authorized mobile device is received for a civilian mobile device, another civilian mobile device call is dropped in order to provide sufficient capacity to complete the call, with the associated preemption process being used to prevent another 911 call from being dropped. This embodiment gives emergency personnel the ability to dial-into an emergency. For example, emergency personnel can use this capacity to call back a civilian who initially called 911 to report an emergency in order to request an update from a potential eye witness. As another example, a first responder can call volunteers within the emergency scene without deputizing their phones, assured of being able to reach the volunteers even though the communications network is otherwise overwhelmed.

TPA operations may be implemented in at least two embodiments of the present invention. In a first embodiment described below with reference to FIG. 6, one or more cellular communication channels are dedicating to TPA calls, providing emergency personnel with dedicated communication capacity while leaving the remaining communication channels to the general public. In a second embodiment described below with reference to FIG. 7, call preemption for TPA calls is implemented only as a TPA allocated communication channel reaches capacity. These embodiments are described separately below.

Figure 6:
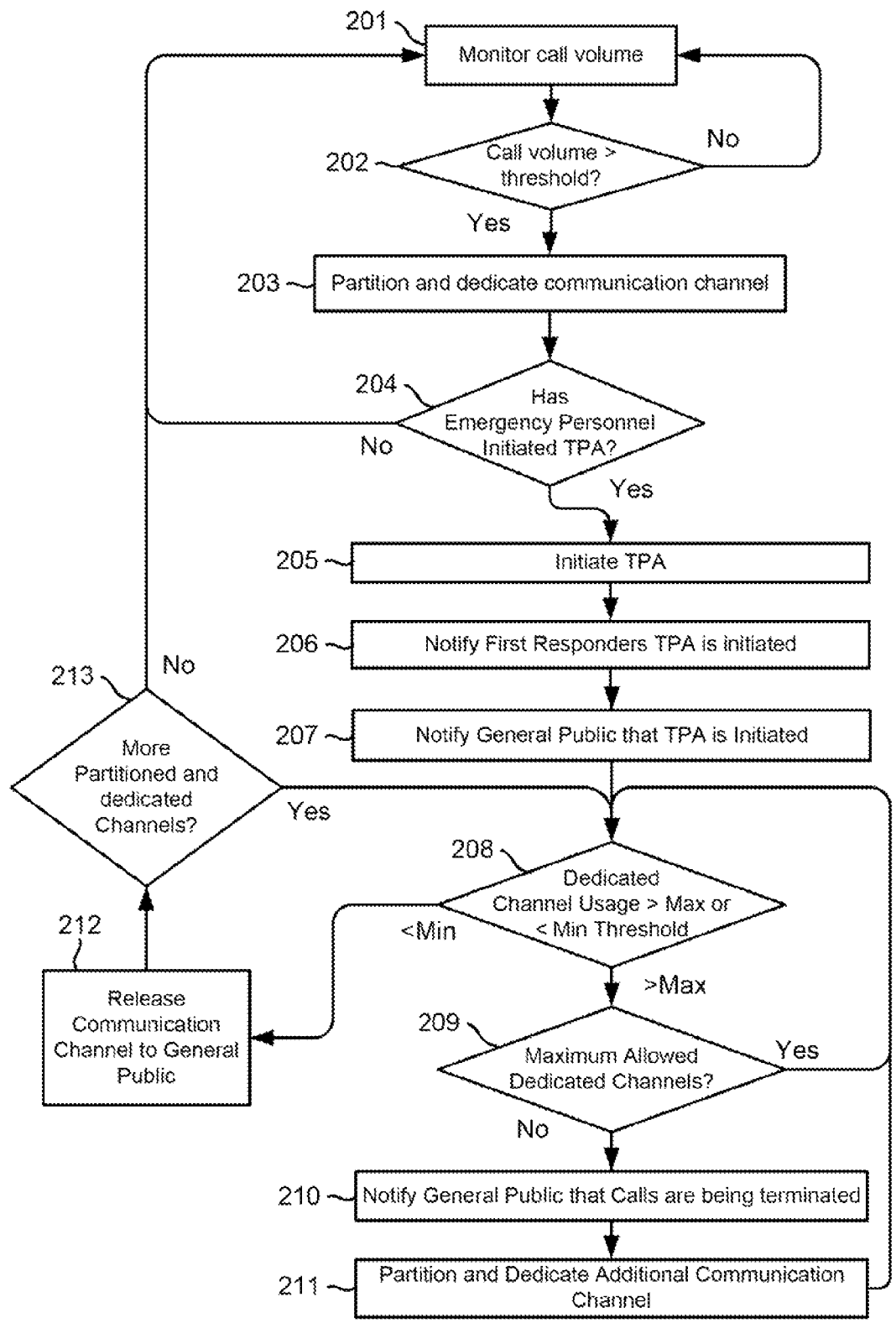
FIG. 6 is a process flow diagram of an embodiment method to manage TPA operations on a network.

FIG. 6 illustrates an example process flow of operations that may be taken to implement the first embodiment of TPA. During normal operations, cellular communication network call volume is monitored, operation 201. In particular, the cellular communication network call volume (or number of access requests or engaged bandwidth) are compared against a predetermined threshold (for example 85% of maximum capacity), operation 202. If the call volume is below the predetermined threshold a normal situation is assumed to exist, so the monitoring process returns to operation 201 to continue monitor call volume. If, however, the call volume (or number of access requests or engaged bandwidth) exceeds the predetermined threshold, an abnormal situation exists which may indicate that an emergency situation is unfolding. To prepare for an emergency situation, network resources (e.g., communication channels on a particular base station antenna) are partitioned and reserved for TPA use, operation 203. By automatically allocating a communication channel to TPA use, the system permits a TPA-authorized mobile device to gain access to the network, even when the network is otherwise overloaded. However, TPA preemption does not occur until a TPA-qualified caller attempts to access an overloaded network.

Since the increased call volume may or may not be in response to an emergency situation, a communication channel allocated to TPA continues to function normally, handling civilian (i.e., non-TPA) calls in the ordinary fashion. In instances where the increased call volume is simply due to coincidental network requests and no TPA-qualified user is attempting to place a call, call preemption enabled by TPA is not needed. Thus, the TPA threshold may be exceeded and TPA implemented even when there is no actual emergency incident. Delaying actual implementation of TPA preemption until the service is required by a first responder increases the reliability of the network under normal circumstances.

The system may be informed that an actual emergency situation is occurring by a TPA-authorized emergency response personnel placing a TPA call within the affected cell zone. When the communication channel is in TPA mode, the cellular system (be it at the base station, BSC/RNC/MSC, or in a central location such as a NOC) monitors incoming and outgoing calls to determine whether any emergency response personnel is using a TPA-pre-registered mobile device or has completed a special dialing procedure invoking TPA preemption, operation 204. If no emergency response personnel has initiated a call using a TPA-authorized mobile device or the special dialing procedure, then the system continues to monitor access requests, operation 204, as well as call volume, operation 201, to determine whether the communication channel should be released from TPA operation, operation 202.

If a call is initiated by a TPA-authorized mobile device, or if the call is generated from a non pre-registered mobile device using the *272 dialing procedure TPA is initiated, operation 205. When TPA is initiated, operation 205, only emergency personnel previously registered or given clearance "on the fly" will be permitted access to the partitioned and reserved network resources. As noted above, TPA will normally be implemented on a single communication channel initially, leaving the remaining channels to general public use. Then, if TPA-use exceeds the capacity of the TPA-allocated network resources another resource can be converted to TPA operation. By dedicating network resources to emergency personnel use one channel or one resource at a time, the remaining network resources are left available for non-essential general public use. In addition, by dedicating network resources for emergency personnel communication, emergency personnel are able to both send and receive calls on their mobile devices.

In an optional embodiment, upon the initiation of TPA, operation 205, the MSC 104 may survey the mobile devices 101 located within the affected cell or serviced by other base station antennae 102 within the same BSC/RNC 103, to identify all registered or temporarily registered first responders. These first responders may then be advised via SMS message (or other methods) that they can utilize the TPA service by placing a call or using the special dialing procedure, operation 206.

In a further optional embodiment, the base station 102, BSC/RNC 103, or MSC 104 may also send messages to all non-emergency mobile devices 101(*a*-*g*) within the affected area/cell 100 advising them to avoid using their mobile device 101(*a*-*g*) except for Emergency 911 calls and to indicate that emergency services have been notified, operation 207. This messaging may be initiated by the PSAP responsible for the incident area, by the local incident Command and Control authority, or by the network service provider. Such messages may be delivered via SMS message or other communication means. The system may also notify callers connected to the channel allocated to TPA use that their calls are being terminated prior to disconnecting the calls.

As the emergency situation continues to unfold and additional emergency response personnel appear on the scene, additional network resources may be required to support emergency personnel communication. Accordingly, the partitioned and dedicated network resource may be monitored to determine whether additional network resources should be partitioned and allocated to TPA. This may be accomplished by comparing the call volume on the partitioned and dedicated network resource to a predefined maximum or minimum threshold, operation 208. If call volume exceeds a predefined maximum (indicating an escalating situation), for example 25% usage of the partitioned and dedicated network resources in the cell site/sector, additional dedicated network resources may be partitioned to TPA operation, operation 211, to allow emergency response personnel to communicate.

In an embodiment, before terminating calls in order to allocate the additional channel to TPA operation, non-essential (i.e., non-emergency personnel) mobile devices 101 that have a call or data sessions in progress with the allocated channel may be informed with a warning tone and/or recorded announcement that their call is being terminated unless a defined code is entered, operation 210. This permits first responders to maintain their calls by quickly entering a code (e.g., their PIN). If an in process call is an emergency 911 call, the defined code may be supplied by a PSAP.

In an embodiment, the system will continue to automatically retrieve and re-allocate network resources for emergency response personnel communication until all available network resources are dedicated to emergency response personnel use. Such an embodiment will maximize communication capabilities of emergency response personnel. Other embodiments may reserve at least a minimum portion of network resource (e.g., one communication channel) to enable the general public the ability to alert emergency response personnel to new or developing emergency situation, such as by placing 911 calls. Accordingly, other embodiments may impose maximum limits to the amount of network resources that are taken away from the general population and dedicated to emergency response personnel communication. To accomplish this, the MSC 104 may determine whether the maximum amount of network resources have been partitioned and dedicated to emergency response personnel communication, operation 209. If the maximum amount of network resources have already been partitioned and dedicated, then the MSC 104 will continue to monitor the level of utilization of the partitioned and dedicated network resources, operation 208. If the maximum amount of network resources that can be partitioned and dedicated has not been reached, then the MSC 104 may (optionally) inform current callers that calls are being terminated, operation 210, and reallocate network resources from general population usage to emergency response personnel communication use, operation 211. Once the additional communication channel has been dedicated, the MCS 104 will return to monitoring the level of utilization of the partitioned and dedicated network resources to determine whether the emergency situation is escalating or de-escalating, operation 208.

As emergency response personnel work to alleviate the emergency incident and return conditions to normal, the need for network resources will decrease as emergency personnel exit the scene. To enable the system to return to normal operations, the MSC 104 may continually monitor the call volume on the partitioned and dedicated network resources for an indication of escalation or de-escalation, operation 208. When the level of use of the partitioned and dedicated network resource drops below a predefined minimum the MSC 104 may begin to re-allocate network resources back to general public usage, operation 212. Network resources may be automatically re-allocated channel by channel, incrementally reducing the resources allocated to emergency personnel usage, returning to normal operations in a stepwise fashion. By demobilizing network resources one channel or network resource at a time, the embodiment provides a flexible communication system which may adapt to the situation as it evolves. If the situation requires more or less network resources for emergency personnel communication, the embodiment system and method can meet the demand while still providing some network resources for the general public to use. The system may wait for a period of time after each release of a TPA-dedicated channel in order to accommodate surges in emergency personnel use during the event wind-down phase, thereby avoiding having to repeat the process of dropping callers, operation 210, unnecessarily.

Once the cellular communication channel has been re-allocated for general public usage, the MSC 104 determines if there are any more network resources that are currently partitioned and dedicated for emergency personnel communication, operation 213. If additional network resources are currently partitioned and dedicated for emergency personnel communication, the MSC 104 returns to operation 208 to determine whether the emergency situation is escalating or de-escalating. As the emergency situation further de-escalates and returns to normal, emergency response personnel require less and less network resources to support their communications. Thus, the MSC 104 will continue to automatically re-allocate network resources to general public usage in response to call volume, operation 212, until all network resources are in normal operating configuration for general public use. The MSC 104 then returns to operation 201 to monitor call volume waiting for the next emergency situation.

Figure 7:
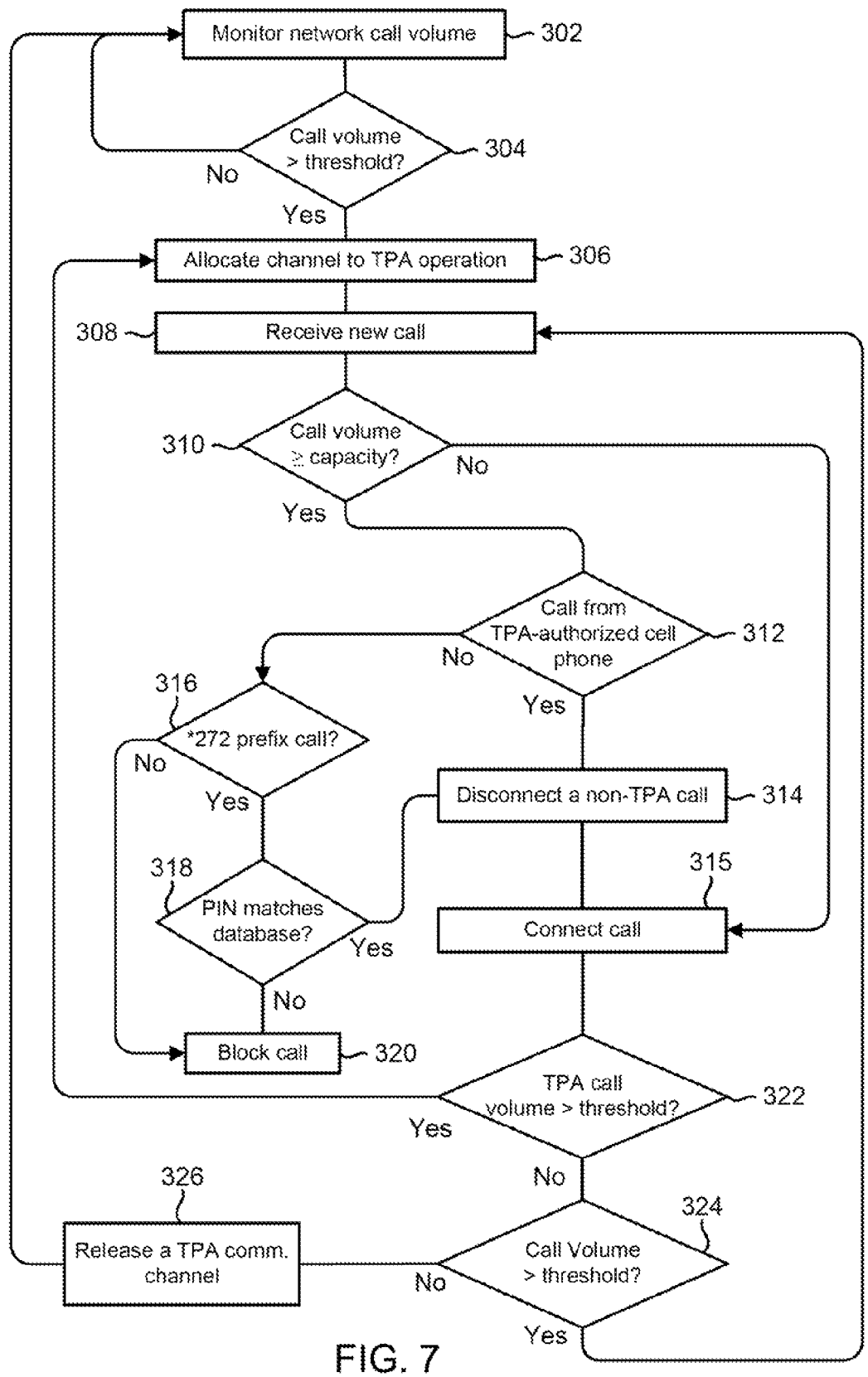
FIG. 7 is a process flow diagram of another embodiment method to manage TPA operations on a network.

In the second embodiment, illustrated in the process flow diagram in FIG. 7, network resources are incrementally allocated to TPA use at level of individual calls by way of call preemption so that public access to the network is maximized while meeting emergency personnel use requirements. During normal operations, cellular communication network usage is monitored, operation 302. Network access requests, call volume or engaged bandwidth may be compared to a predetermined threshold (for example 85% of maximum capacity), operation 304. If the usage is below the predetermined threshold, a normal situation is assumed to exist, so the monitoring process returns to operation 302 to continue monitoring call volume. If, however, the usage exceeds the predetermined threshold, an abnormal situation exists which may indicate that an emergency situation is unfolding. To prepare for an emergency situation, network resources, such as a communication channel on an affected base station antenna, are partitioned and reserved for TPA use, operation 306. By automatically allocating a communication channel to TPA use, the system permits a TPA-authorized mobile device to gain access to the network, even when the network is otherwise overloaded. However, TPA preemption does not occur until a TPA-qualified caller attempts to access an overloaded network.

Since the increased call volume may or may not be in response to an emergency situation, a communication channel allocated to TPA continues to function normally, handling civilian (i.e., non-TPA) calls in the ordinary fashion. In instances where the increased call volume is simply due to coincidental call volume and no TPA-qualified user is attempting to place a call, call preemption enabled by TPA is not needed. Thus, the TPA threshold may be exceeded and TPA implemented even when TPA call preemption is not required. Delaying actual implementation of TPA preemption until preemption is required by a first responder increases the reliability of the network under normal circumstances.

With a network resource allocated to TPA operation, the cellular system (be it at the base station, BSC/RNC or in a central location such as an MSC) monitors incoming and outgoing calls, operation 308. The TPA-allocated channel continues to function as a normal cellular communication channel until (a) the channel is at capacity (i.e., current call volume through the channel equals its maximum capacity) and (b) a TPA-qualified mobile device attempts to access the network to place or receive a call. Call volume on the TPA-allocated communication channel is monitored to determine whether a call must be dropped in order to connect a TPA-qualified call. Thus, when a new call is received (incoming or outgoing) that will be allocated to the TPA-allocated channel, the system may first determine whether that channel is presently at capacity (i.e., has as many calls connected as the channel can reliably maintain), operation 310. If the channel is not at capacity (i.e., there is excess capacity on the network), the call may be connected, operation 315. This monitoring of the TPA channel will prevent disconnecting a civilian call if sufficient capacity exists on the channel to enable connection of a new incoming or outgoing TPA call.

As discussed above, the system can recognize a TPA-authorized call by determining if the source or destination mobile device is a TPA-registered mobile device, operation 312, and if not by the caller completing a special dialing procedure invoking TPA preemption, operation 316. If the caller is using (or the call is placed to) a TPA-registered mobile device, at least one non-TPA call connected on the TPA-allocated channel, operation 314, in order to release capacity sufficient to connect the TPA call, operation 315. This allows the TPA-qualified first responder to make a call without delay even though the network is at capacity. Similarly, if an incoming call is directed to a TPA-qualified mobile device, at least one non-TPA call on the TPA channel is terminated in order to connect the incoming call to the TPA-qualified mobile device. The process of terminating non-TPA calls from the allocated channel will continue as more calls to TPA-qualified mobile devices access the network.

If the caller is not using a TPA-registered phone and did not enter a *272 type dialing sequence, then the call is blocked, operation 320, as a non-emergency call at a time when system resources are at capacity. If the caller has entered the special dialing sequence (such as *272 plus a PIN), the entered PIN is compared to PIN values stored in a database (e.g., at the base station 102, BSC/RNC 103, or MSC 104), operation 318. If the PIN matches a registered emergency personnel, a non-TPA call connected on the TPA allocated channel may be disconnected, operation 314, in order to release capacity sufficient to connect the TPA call, operation 315.

The system will also monitor call volume on the TPA-allocated channel, operation 322 to ensure sufficient capacity remains to accommodate further emergency personnel requirements. TPA-call volume (i.e., the volume of calls to/from TPA-qualified mobile devices) on a TPA-allocated communication channel may be compared to a threshold value in operation 322 to determine when to allocate another communication channel to TPA use. If the TPA call volume threshold is exceeded (i.e., test 322="Yes"), another channel will be allocated to TPA functions operation 306 (see description of this operation above).

TPA-call volume on each TPA-allocated channel, operation 322, as well as call volume on all channels, operation 324, continue to be monitored to determine when TPA calls are no longer being made, as will occur when the emergency is resolved and first responders leave the scene, or when total call volume returns to a level at which TPA operation is no longer required. If call volume continues to exceed the TPA threshold, then the system will continue to operate at least one channel in TPA mode, accepting calls, operation 308, checking for TPA channel call volume, operation 310 and connecting calls, operation 315, if the call is from/to a TPA authorized mobile device operation 312 or if call volume is less than capacity. As TPA-call volume declines, the number of channels allocated to TPA-operation can be reduced by releasing a TPA channel, operation 326. The monitoring call volume and releasing of channels from TPA allocation will continue until all communication channels are returned to normal operations. Also, if call volume on non-TPA channels drops back to normal, the system may deactivate TPA operation on all allocated channels since the normal capacity of the network can accommodate TPA-qualified callers without the need for TPA preemption.

This second embodiment allows TPA-allocated channels to be operated in a fashion that ensure every TPA-authorized caller can access the network while providing maximum bandwidth possible to the general public. Monitoring of TPA channel call volume allows the system to avoid dropping civilian calls if sufficient capacity exists on the channel to enable connection of a new incoming or outgoing TPA call. If no emergency response personnel has initiated a call using a TPA-authorized mobile device or the special dialing procedure, then the system continues to monitor access requests, operation 308, as well as the call volume, operation 324, to determine whether the communication channel should be released from TPA operation, operation 326.

An additional embodiment provides prioritizing access to TPA-dedicated network resources to enable highest priority callers to use the cellular communication network. In a situation where the number of emergency responders can exceed the capacity of the cellular network resources, this embodiment enables high priority users, such as national leadership and on-site commanders, to preempt other, lower priority users in order to gain instant access to the network. High priority users can use their pre-registered mobile devices to gain access to the network. The unique ID of their mobile devices can be used to determine the priority of the user from a database of unique IDs. Similarly, high priority users can identify themselves to the network using the special dialing procedure, with their PIN providing sufficient information for the network (e.g., the MSC 104) to determine the priority of the user from a database of PINs. Using the priority value determined from a database, the network (e.g., the MSC 104) can determine whether the present caller has a higher priority than any callers already connected to TPA-allocated network resources. Assuming the mobile device 101 is properly authorized, the call will be given priority in the queue on the TPA-allocated network resource so that the emergency personnel member using the pre-registered authorized mobile device will be able to complete the call. If the network resource is at capacity, a call from a person with a lower priority level may be dropped in order to free up sufficient capacity to complete the call.

Figure 8:
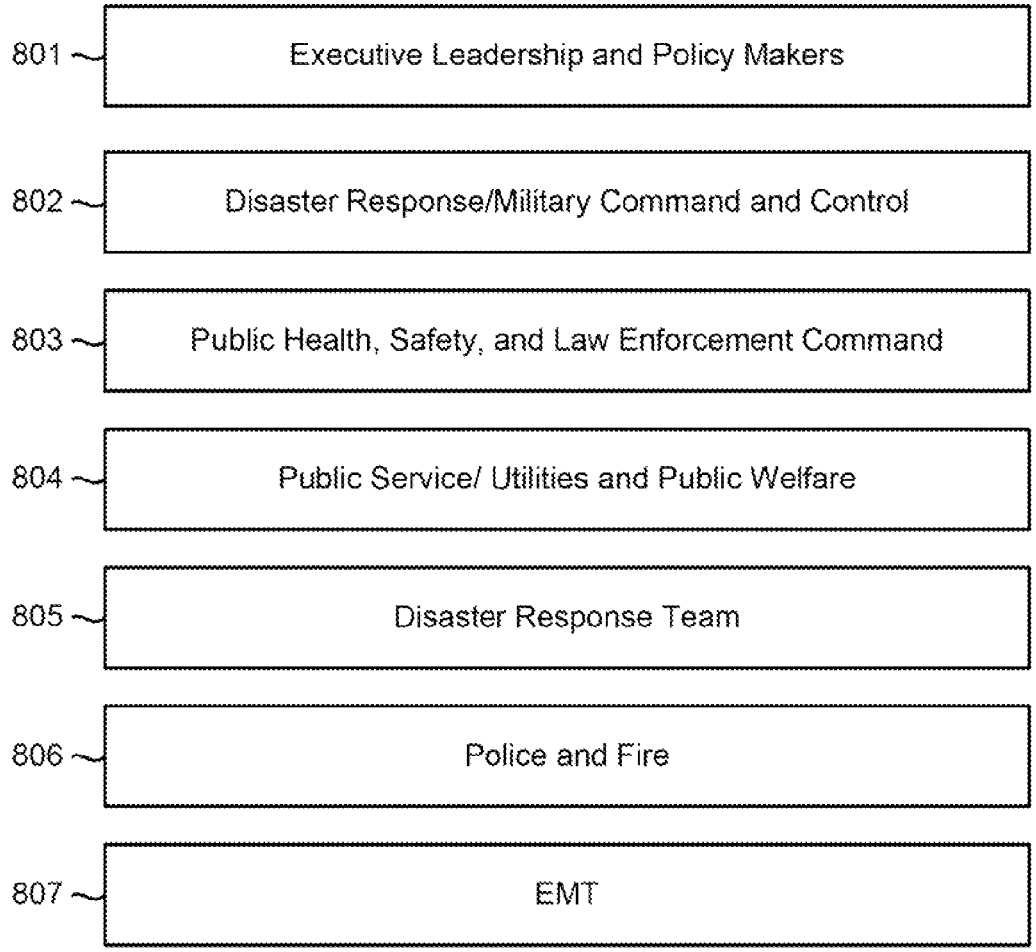
FIG. 8 is an example hierarchical table of classes of users given priority access to emergency communication resources.

FIG. 8 illustrates an example hierarchy of emergency response personnel. As shown in FIG. 8, Executive Leaders and Policy Makers 801 may be given highest priority status. Members of this class cab pre-register their mobile devices 101 such that the mobile device 101 unique identifier is stored in a hierarchy database. If a call is placed from any mobile device pre-registered to a member of the executive leader and policy maker class 801, the call is placed first in any queue of partitioned and dedicated network resources. Similarly, Disaster Response/Military Command and Control personnel 802 may be provided the next highest priority class, followed by Public Health, Safety, and Law Enforcement Command 803, Public Service/Utilities and Public Welfare 804, and Disaster Response Team 805. Lower level priority may be afforded to line police and firefighters 806 and emergency medical technicians 807. In all cases, mobile devices may be pre-registered so their unique identifiers and/or the user's PIN can be stored in a hierarchy database to support this embodiment.

The foregoing embodiments may also be implemented in a cellular system using a deployable "switch on wheels" cellular communication system. Since such systems may be implemented in large scale emergency/disaster situations with access limited to emergency responders and command authority, network overload will occur from too many authorized (i.e., non-civilian) users placing calls at the same time. To ensure reliable communications in such cases, the deployable switch on wheels can implement the caller priority embodiment so that callers with highest priority (e.g., national and regional commanders) have assured access to cellular communications, while lowest priority authorized users may be disconnected if necessary. In this embodiment, a database of authorized users indicating individual priority (hierarchy) levels (e.g., illustrated in FIG. 8) may be maintained in a server within the deployable switch on wheels.

The foregoing embodiments have been described as being implemented by the MSC 104. One of skill in the art would appreciate that the foregoing embodiments may be implemented within a number computer switching system elements within the cellular communications network, including but not limited to the base station 102, BSC/RNC 103 or NOC. Monitoring of call volume on communication channels and within a cell is performed automatically already. Such systems may be reprogrammed to implement the foregoing embodiments so that the implementation of TPA operations is performed automatically. Thus, the system can automatically recognize when call volumes exceed thresholds so that a communication channel should be allocated to TPA operation. The system can further recognize TPA authorized calls as described above and dedicate network resources and perform the call connections and disconnections described above automatically. Similarly, as call volume declines below the TPA threshold levels, the systems can automatically return the network to normal configuration. In this manner, the cellular communication network can respond to emergency situations to enable assured communications for emergency personnel without the need for human action or intervention. For example, even if an event goes unreported (e.g., no one bothers to dial 911), the system will nevertheless respond to excess call volume to enable an emergency responder to use the network. This capability also ensures police, fire and EMT personnel (typical individuals who may be authorized to implement TPA) can use the cellular communication network during times of peak usage, such as during rush hour on the freeway or following conclusion of a major sporting event.

As discussed above, the various embodiments overcome the limitations of conventional Wireless Priority Access (WPA) systems by performing Tiered Priority Access (TPA) operations, which may include monitoring a wireless network's call volume, determining whether the call volume exceeds a threshold, partitioning network resources for use by emergency personnel when the call volume exceeds the threshold, reserving a portion of the partitioned resources for the emergency personnel, monitoring calls to determine whether calls are being made to or from mobile devices associated with emergency personnel, and restricting general access to the reserved resources when there are calls are being made to or from the mobile devices associated with emergency personnel. In various embodiments, these and other TPA operations may be performed by a processor coupled to a base station component (e.g., base transceiver station, NodeB, eNodeB, etc.) and outside of the core network. In an embodiment, the TPA operations may be performed at or on an Evolved Node B (eNodeB), such as by an eNodeB processor, a processor coupled to the eNodeB component, or in a server or agent (e.g., Diameter agent, a specialized server, a software application, a process, a computing system, etc.) in communication with the eNodeB component.

In an embodiment, the mobile device users may be ranked or organized into priority groups, and the system may be configured to determine the priorities and/or access rights of the mobile device based on the rankings or priority groups to which the mobile device user belongs. In an embodiment, the rankings/priority groups may be determined in a network server, with the rankings/priority information being sent to a base station component (e.g., eNodeB, etc.) for enforcement. In another embodiment, the base station component may be configured to generate the rankings/priorities locally in the base station component.

Figure 9A:
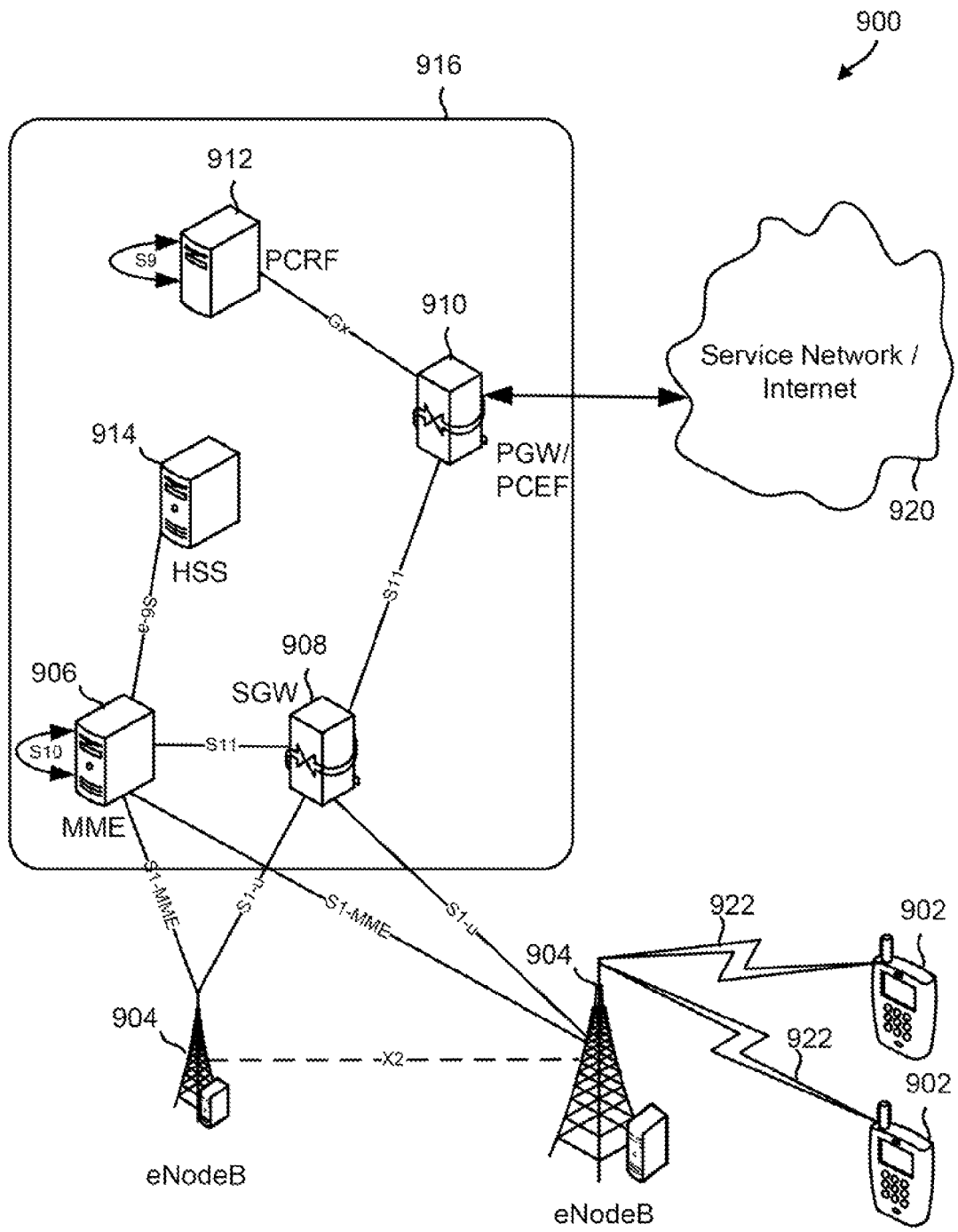
FIGS. 9A-B are system block diagrams illustrating network components in an example communication system suitable for use in the various embodiments.

FIG. 9A illustrates network components and information flows in an example Long Term Evolution (LTE or 4G LTE) communication system 900 suitable for implementing the various embodiments. A typical LTE communication system 900 includes a plurality of eNodeB 904 components coupled to a mobility management entity (MME) 906 component and serving gateway (SGW) 908. The MME 906 and SGW 908 may be part of a core network 916, such as a system architecture evolution (SAE) or evolved packet core (EPC) network. The eNodeB 904 may be outside of the core network 916.

The eNodeB 904 may be configured to communicate voice, data, and control signals between mobile devices 902 (e.g., cell phones) and to other network destinations. The eNodeB 904 may act as a bridge (e.g., layer 2 bridge) between the mobile device 902 and the core network 916 by serving as the termination point of all radio protocols towards the mobile devices 902 and relaying voice (e.g., VoIP, etc.), data, and control signals to network components in the core network 916. The eNodeB 904 may be configured to perform various radio resource management operations, such as controlling the usage of radio interfaces, allocating resources based on requests, prioritizing and scheduling traffic according to various quality of server (QoS) requirements, monitoring the usage of network resources, etc. The eNodeB 904 may also be configured to collect radio signal level measurements, analyze the collected radio signal level measurements, and handover mobile devices 902 (or connections to the mobile devices) to another base station (e.g., a second eNodeB) based on the results of the analysis.

Generally, mobile devices 902 send and receive voice, data and/or control signals to and from an eNodeB 904 via a wireless communication link 922. The eNodeB 904 may send signaling/control information (e.g., information pertaining to call setup, security, authentication, etc.) to the MME 906 via the S1-AP protocol on the S1-MME interface. The MME 906 may request user/subscription information from a home subscriber server (HSS) 914 via the S6-a protocol, communicate with other MME components via the S10 interface, perform various administrative tasks (e.g., user authentication, enforcement of roaming restrictions, etc.), select a SGW 908, and send authorization and administrative information to the eNodeB 904 and/or SGW 908 (e.g., via the S1-MME and S11 interfaces).

Upon receiving the authorization information from the MME 906 (e.g., an authentication complete indication, an identifier of a selected SGW, etc.), the eNodeB 904 may send data received from the mobile device 902 to a selected SGW 908 via GTP-U protocol on the S1-U interface. The SGW 908 may store information about the received data (e.g., parameters of the IP bearer service, network internal routing information, etc.) and forward user data packets to packet data network gateway (PGW) and/or a policy control enforcement function (PCEF) 910 via the S11 interface.

The PGW/PCEF 910 component(s) may include a PCEF component coupled to a PGW component, a PCEF component included in a PGW component, or a PCEF component configured to perform operations typically associated with a PGW component. Since these structures are well known, certain details have been omitted in order to focus the descriptions on the most relevant features. Detailed information about policy and charging enforcement function operations may be found in "3rd Generation Partnership Project Technical Specification Group Services and System Aspects, Policy and Charging Control Architecture," TS 23.203 (updated Jun. 12, 2011), the entire contents of which are incorporated herein by reference.

The PCEF/PGW 910 may send signaling information (e.g., control plane information) to a policy control rules function (PCRF) 912 component, such as over a Gx interface. The PCRF 912 component may be responsible for identifying the appropriate policy rules for a given communication session. The PCRF 912 component may communicate with external PCRF components (not illustrated) via the S9 interface, access subscriber databases, create policy rules, and/or send policy rules to the PCEF/PGW 910 component(s) for enforcement.

The PCEF/PGW 910 may receive policy rules from the PCRF 912 component and enforce the received policy rules to control the bandwidth, the quality of service (QoS), and/or other characteristics of the data that is to be communicated between the service network 920 and the mobile devices 902. The PCEF/PGW 910 may also coordinate, allocate, add, remove, and/or adjust various resources (e.g., network resources, subscriber resources, etc.) based on the received policy rules.

As discussed above, network activity/traffic is typically controlled from within the core network 916 by the PCEF/PGW 910 component(s). In contrast to existing solutions, various embodiments include an eNodeB 904 component configured to perform TPA operations to control network activity/traffic from outside the core network 916. The eNodeB 904 may be configured to monitor network activity (e.g., call volume, etc.) and partition, allocate, and/or adjust network resources based on the current network conditions. The eNodeB 904 may also be configured to dynamically "shape" the network activity of a mobile device 902 based on the network conditions. Shaping the network activity of a mobile device may include reducing bandwidth, reducing QoS, restricting the number of services, shedding a connection, transferring a connected device to another tower (e.g., the second eNodeB, etc.), performing handoffs, etc.

In an embodiment, an eNodeB 904 may be configured to classify or organize the mobile devices 902 into priority groups or classes, such as primary users (e.g., first responders or other priority users) and secondary users (e.g., non-priority users).

In an embodiment, an eNodeB 904 may be configured to shape the network activity of mobile devices based on the priority groups/classes. In an embodiment, the eNodeB 904 may shape the network activity such that mobile devices belonging to a higher priority group are allocated a larger percentage of the available network resources (e.g., bandwidth, etc.) as the network activity increases.

Figure 9B:
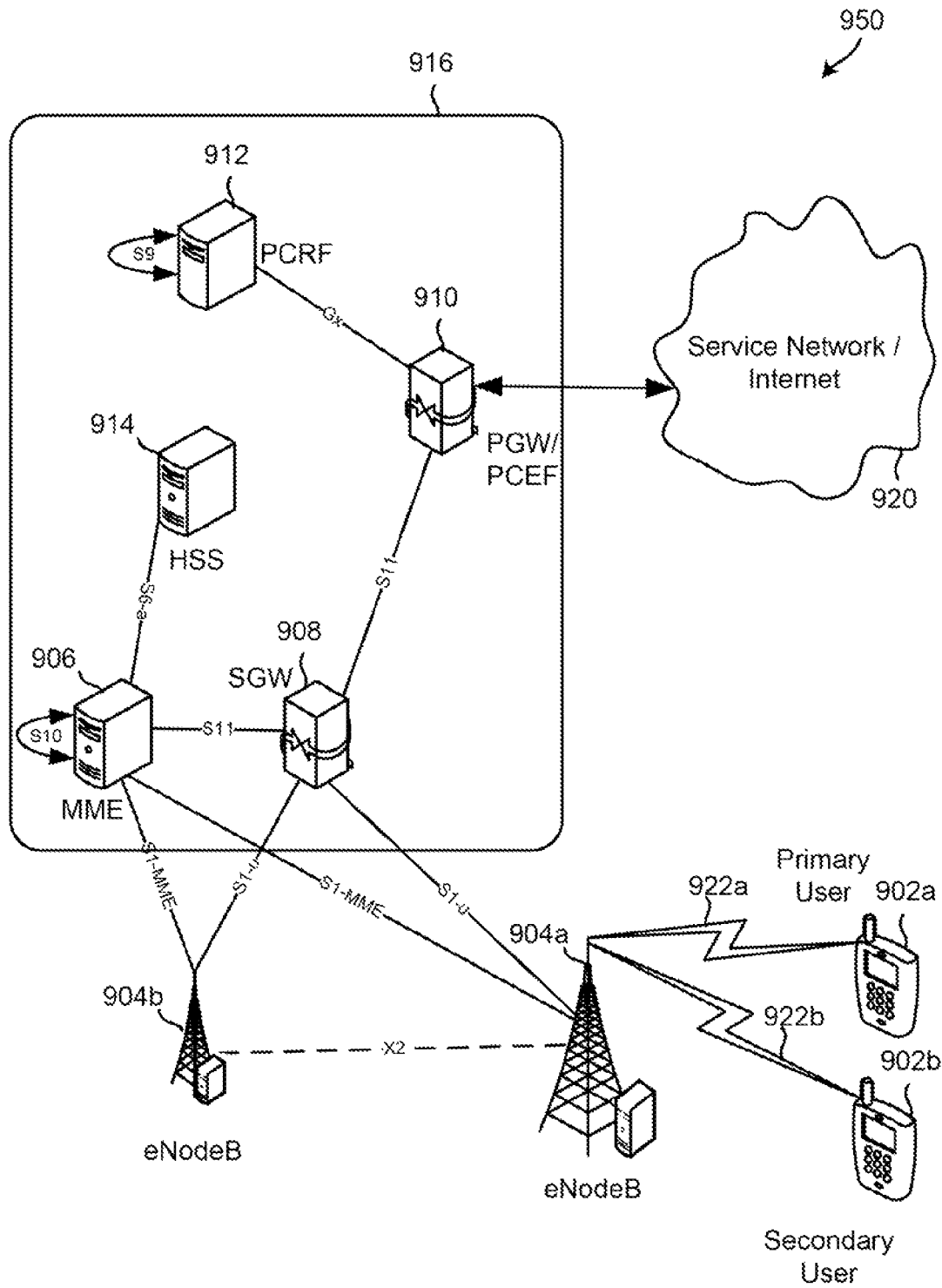

FIG. 9B illustrates network components and information flows in an LTE communication system 950 that includes an embodiment eNodeB 904a configured to perform TPA operations and/or shape the network activity of mobile devices based on the priority groups/classes. In the example illustrated in FIG. 9B, the LTE communication system 950 includes an MME 906, an SGW 908, a HSS 914, a PGW/PCEF 910, and a PCRF 912, all of which are logically inside the core network 916. The LTE communication system 950 also includes first mobile device 902a, a second mobile device 902b, a first eNodeB 904a, and a second eNodeB 904b, all of which are logically outside of the core network 916. The first mobile device 902a is classified as a primary user's mobile device 902a and the second mobile device 902b is classified as a secondary user's mobile device 902b. The primary user's mobile device 902a is connected to the first eNodeB 904a via a first wireless communication link 922a. The secondary user's mobile device 902b is connected to the first eNodeB 904a via a second wireless communication link 922b.

The first eNodeB 904a may be configured to monitor network activity (e.g., call volume, resource usage, congestion, number of active connections, etc.) to determine whether the network activity exceeds two or more thresholds. When the network activity exceeds a first threshold, the first eNodeB 904a may reserve a communication channel for the primary user's mobile device 902a. When the network activity exceeds a second (or subsequent) threshold, the first eNodeB 904a may dynamically "shape" the network activity of the secondary user's mobile device 902b. Shaping the network activity of a mobile device may include performing operations to control one or more characteristics of the wireless communication link 922b and/or the data being communicated, such as reducing bandwidth, reducing QoS, restricting the number of services, shedding a connection (e.g., wireless communication link 922b, etc.), transferring a connected device to another eNodeB (e.g., the second eNodeB 904b), performing handoffs, etc.

There are a number of advantages to shaping the network activity of the mobile devices via an eNodeB 904, including faster detection and response times, improved efficiency, and more focused application of solutions. For example, since the eNodeB 904 is outside of the core network 916, it can detect and respond to changes in network activity much faster than the PCEF/PGW 910 component or any other component that is inside the core network 916. In an addition, the eNodeB 904 may respond to changes in network activity and/or resource availability on a cell-by-cell or tower-by-tower basis, whereas existing solutions typically require applying the changes to an entire geographical area, updating network wide policies/controls, or applying restrictions to a specific subscriber or mobile device.

Further, by shaping the network activity on an eNodeB 904, restrictions applied to a mobile device 902 apply only when the mobile device 902 attempts to communicate via a specific eNodeB 904, and do not follow the mobile device 902 after a handoff. For example, when a first eNodeB 904a restricts the amount of bandwidth available to a mobile device, then hands off the mobile device to a second eNodeB 904b, the bandwidth restrictions applied by the first eNodeB 904a would not be enforced on the mobile device by the second eNodeB 904b (as it would if the restriction were applied centrally by a component within the core network 916, such as a PCEF/PGW 910). This eliminates additional messages or operations that would otherwise be necessary to restore a mobile device's restricted properties (e.g., bandwidth, QoS, etc.), and thus improves efficiency.

As discussed above, an eNodeB may be configured to classify or organize the mobile devices into classes. In an embodiment, the eNodeB may be configured to perform internal tiered priority access (ITPA) operations, which may include subdividing the classes into a plurality of tiers. The eNodeB 904 may then shape the network activity of the mobile devices based on the priority classes and tiers to more precisely control the allocation of network resources.

Figure 10:
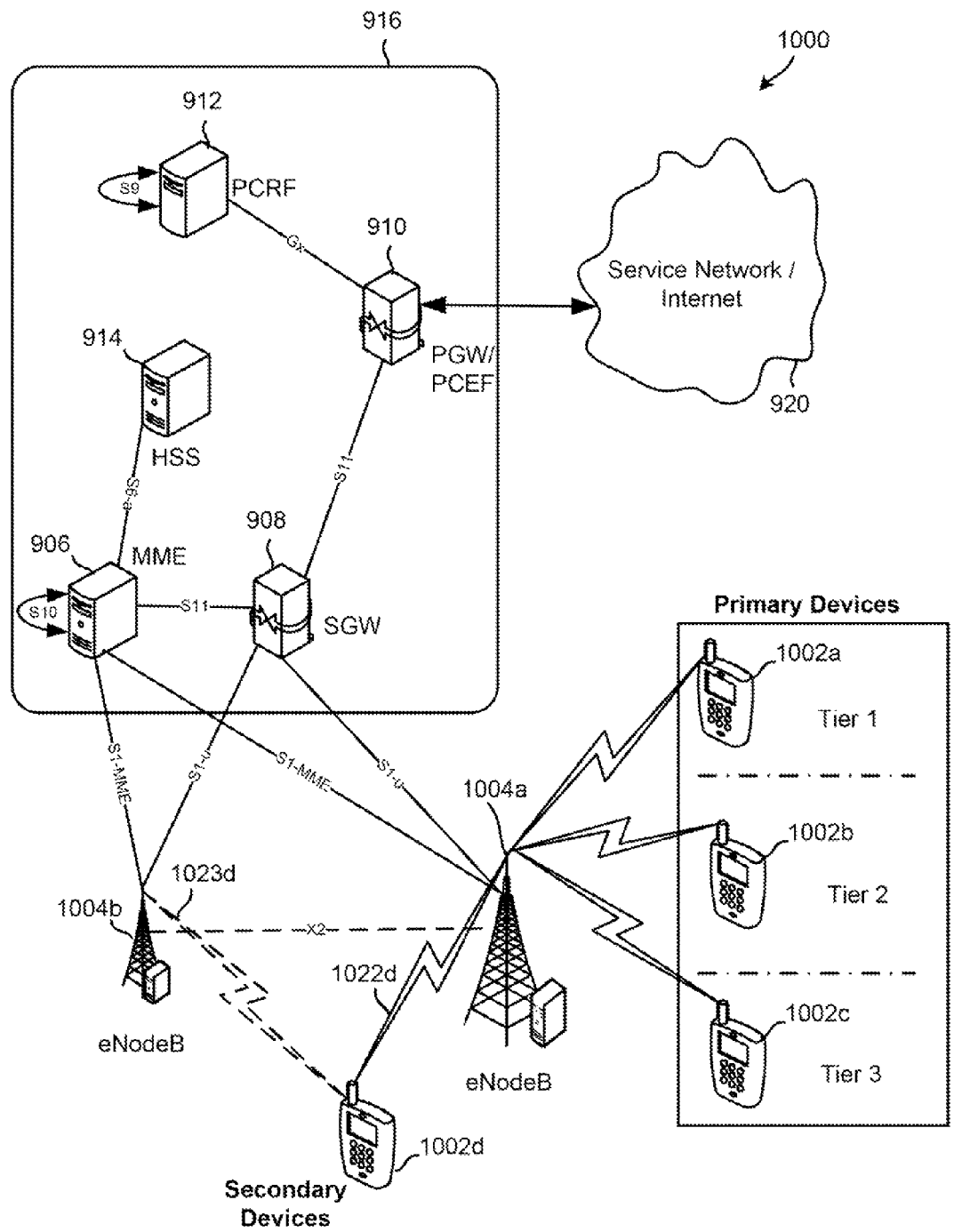
FIG. 10 is a system block diagram illustrating user classes and tiers in an LTE cellular communication network.

FIG. 10 illustrates network components and information flows in an example LTE cellular communications network 1000 that includes an eNodeB 1004a configured to perform ITPA operations in accordance with various embodiments. The first eNodeB 1004a may be configured to classify or organize the mobile devices into classes, then subdivide the classes into a plurality of tiers. In the example illustrated in FIG. 10, mobile devices 1002a-c are classified as primary mobile devices, the mobile device 1002d is classified as a secondary mobile device, and the primary mobile devices 1002a-c are subdivided into first, second, and third tiers. While two classes and three tiers are illustrated, it should be understood that the eNodeB 1004a may classify the mobile devices 1002 into any number of classes, and that each class maybe subdivided into any number of tiers.

The first eNodeB 1004a may be configured to monitor network activity (e.g., call volume, etc.) to determine whether the network activity exceeds any one of a plurality of thresholds. The plurality of thresholds may include any number of thresholds and each threshold may store any value relating to any measureable network activity or event (congestion, bandwidth, usage trends, availability of resources, QoS, etc.).

The first eNodeB 1004a may be configured to reserve communication channels and/or dynamically shape the network activity of one or more of the mobile devices 1002a-d in response to determining that a threshold is exceeded. The shaping operations may be performed such that higher priority mobile devices are allocated a larger percentage of the available network resources (e.g., bandwidth, etc.) as the network activity increases or resources become scarce. In an embodiment, this may be achieved by progressively reducing the number of network resources available to lower priority mobile devices.

In an embodiment, the plurality of thresholds may include a series of progressive threshold values. For example, the plurality of thresholds may include a first threshold value that is exceeded when 50% of the network resources are in use, a second threshold value that is exceeded when 75% of the network resources are in use, a third threshold value that is exceeded when 85% of the network resources are in use, a fourth threshold value that is exceeded when 95% of the network resources are in use, etc.

When the first eNodeB 1004a determines that the monitored network activity exceeds the first threshold value, the first eNodeB 1004a may reserve bandwidth or radio frequency (RF) resources for the primary mobile devices 1002a-c.

When the network activity exceeds the second threshold value, the first eNodeB 1004a may dynamically shape the network activity of the secondary mobile device 1002d by reducing the amount of bandwidth or RF resources that is made available to the secondary user's mobile device 1002d.

When the network activity exceeds the third threshold, the eNodeB 1004a may further shape the network activity of the secondary mobile device 1002d by shedding/terminating the wireless communication link 1022d and/or transferring the wireless communication link 1022d to the second eNodeB 1004b. In an embodiment, transferring the wireless communication link 1022d to the second eNodeB 1004b may include the first eNodeB 1004a communicating with the second eNodB 1004b via the X2 interface, the second eNodB 1004b establishing a new wireless communication link 1023d with the secondary mobile device 1002d, and the first eNodeB 1004a shedding/terminating the wireless communication link 1022d.

When the network activity exceeds a fourth threshold, the first eNodeB 1004a may begin shaping the network activity of the primary mobile devices 1002a-c by, for example, reducing the amount of bandwidth or radio resources made available to the tier three primary mobile devices 1002c. This process may continue until only the tier one primary mobile devices 1002a are connected to the first eNodeB 1004a, or until there are no mobile devices connected to the first eNodeB 1004a (i.e., to preserve resources for additional emergency personal who may arrive in the future, etc.).

While the above examples are described with reference to a specific set of shaping operations, a specific number of classes/tiers, and specific threshold values, it should be understood that any combination of shaping operations may be performed based on any combination of classes/tiers and for any number of threshold values.

Figure 11A:
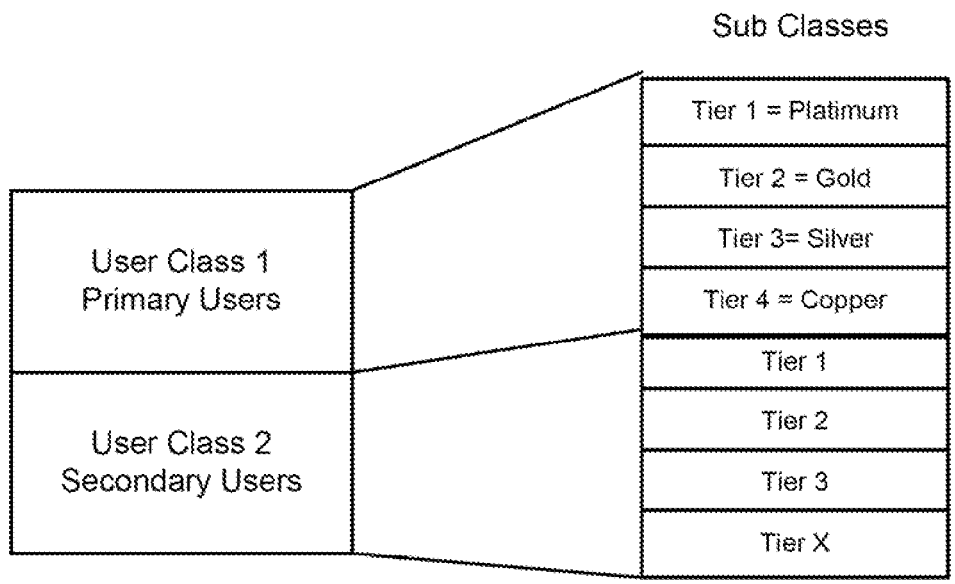
FIGS. 11A and 11B illustrate example tables illustrating possible combinations of classes and tiers.
Figure 11B:
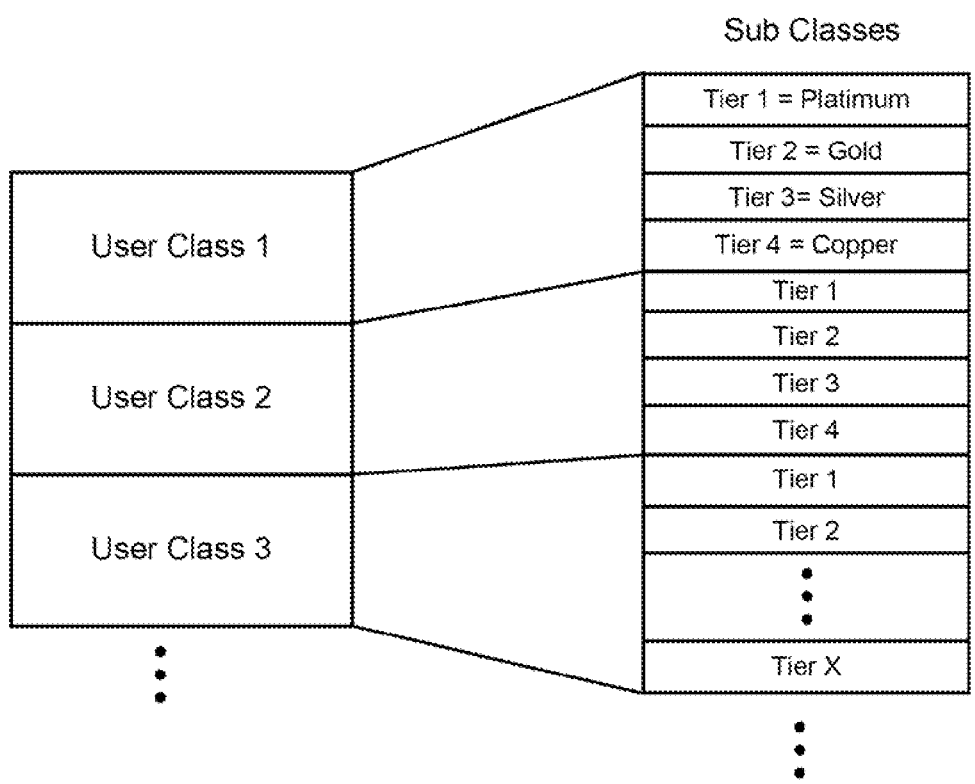

FIGS. 11A-B illustrate that an eNodeB may classify the mobile devices into any number of classes, and that each class may be subdivided into any number of tiers. Specifically, FIG. 11A illustrates that eNodeB may classify the mobile devices into a primary class and a secondary class, the primary class may be subdivided into four tiers (e.g., platinum, gold, silver, copper), and a secondary class may be subdivided into multiple tiers (e.g., tiers 1-x). FIG. 11B illustrates an alternative arrangement with three classes, each of which is subdivided into multiple tiers.

As discussed above, shaping operations may include adjusting, controlling, and/or allocating any of a number of resources (radio links, bandwidth, resource blocks, CPU time, etc) available in the communications network. As also discussed above, the eNodeB may perform shaping operations based on one or more triggers or threshold values. A trigger may be any event that indicates network activity has changed and/or which may initiate shaping operations, and a threshold may store any value relating to any measureable network activity or event (congestion, bandwidth, usage trends, availability of resources, QoS, etc.). One or more triggers or threshold values may be assigned to, or associated with, any or all of the resources available in the communications network. Similarly, a single trigger/threshold value may be associated with multiple resources, and multiple triggers/threshold values may be associated with a single resource. For example, the eNodeB may monitor multiple resources, generate a composite value representative of the general availability of the resources, compare the generated composite value to a threshold value to determine whether shaping operations are to be performed, and shape the network activity of one of more mobile devices based on the results of the comparison.

Figure 12A:
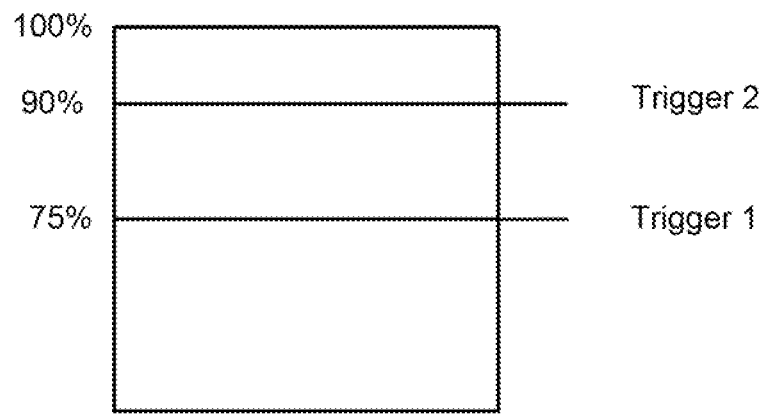
FIGS. 12A and 12 B are example tables illustrating possible arrangements of triggers or threshold values for resources.
Figure 12B:
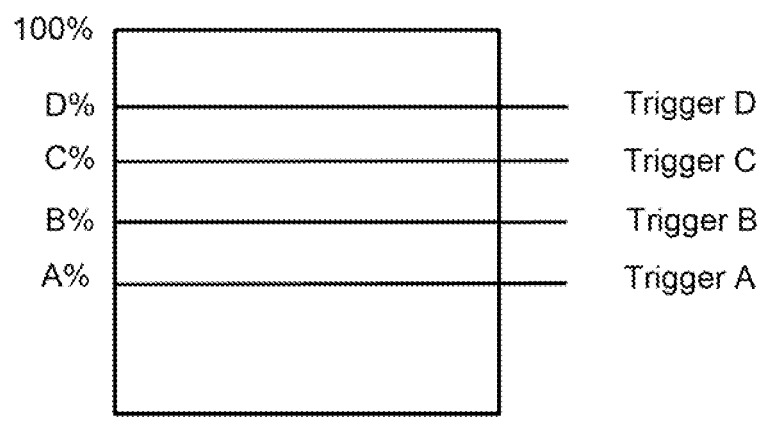

FIGS. 12A-B illustrate example threshold values and triggers suitable for use in various embodiments. FIG. 12A illustrates that a first trigger may be activated when the eNodeB determines that the usage of an available resource (e.g., radio links, resource blocks, etc.) exceeds a threshold value of 75% usage. A second trigger may be activated when it is determined that the usage of the available resource exceeds a threshold value of 90% usage. The activation of the first trigger may cause an eNodeB to perform a first group of operations (e.g., QoS degradation, handoffs, etc.). The activation of the second trigger may cause the eNodeB to perform a second group of operations (e.g., traffic shedding, etc.).

FIG. 12B illustrates an alternate arrangement of triggers with four triggers (A, B, C, and D) assigned at different percentages or levels of resource usage. Alternate embodiments may include any number of triggers, and each trigger may be assigned any threshold value representing any percentage or level of resource usage.

In an embodiment, a network server in the communication network may determine the threshold values and/or triggers. In an embodiment, the eNodeB may be configured to dynamically determine and set the threshold values and/or triggers based on network conditions, such as the availability of resources, number of connections, bandwidth availability, number of services, number of classes, number of tiers, etc. In the manner, the eNodeB may quickly adjust to changing network conditions to ensure that the resources are allocated efficiency.

As discussed above the classes and/or tiers to which mobile devices belong may be determined in the eNodeB or a network server. In an embodiment, the classes to which the mobile devices belong may be determined in the eNodeB based on the home PLMN to which the mobile devices belong. In an embodiment, the classes to which the mobile devices belong may be determined in a network server of their respective home PLMNs, and made available to an eNodeB of a visiting network via an MME component.

In an embodiment, the eNodeB may be configured to dynamically determine and set the threshold values and/or triggers based on network conditions, such as the availability of resources, number of connections, bandwidth availability, number of services, number of classes, number of tiers, etc. In this manner, the eNodeB may quickly adjust to changing network conditions to ensure that the resources are allocated efficiency.

Generally, a mobile device may maintain several operational bearer channels at a time. In an embodiment, the eNodeB may be configured to shape the network activity of a mobile device by adjusting the characteristics of any or all of the operational bearer channels. In an embodiment, the eNodeB may be configured to adjust the characteristics of a bearer channel locally, based on the home PLMN, and/or independent of the PGW/PCEF and PCRF settings or operations. In this manner, the eNodeB may quickly ensure that higher priority users (e.g., primary users, etc.) have resources available.

Figure 13A:
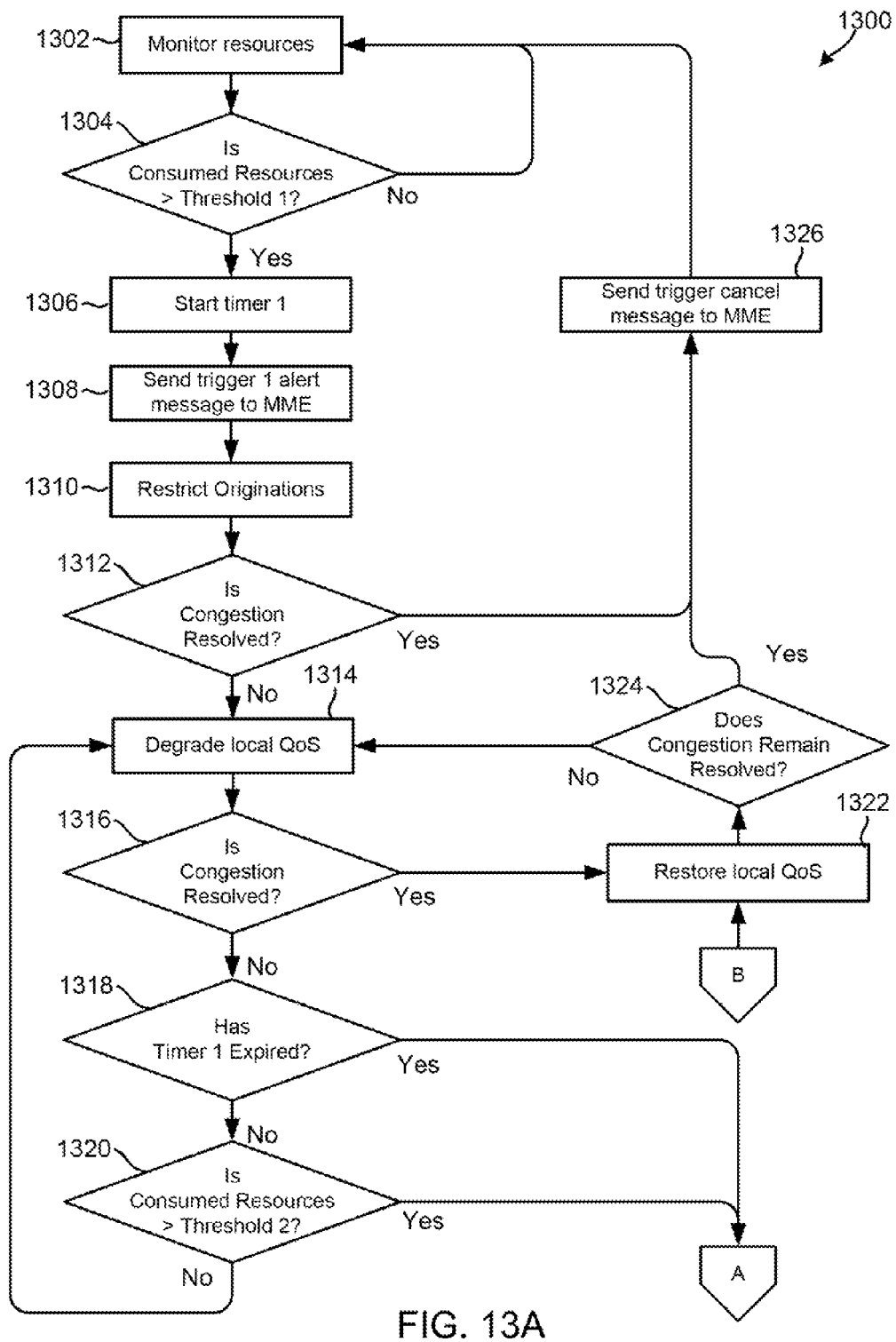
FIGS. 13A and 13B are a process flow diagram of an embodiment method to manage ITPA operations on a network.
Figure 13B:
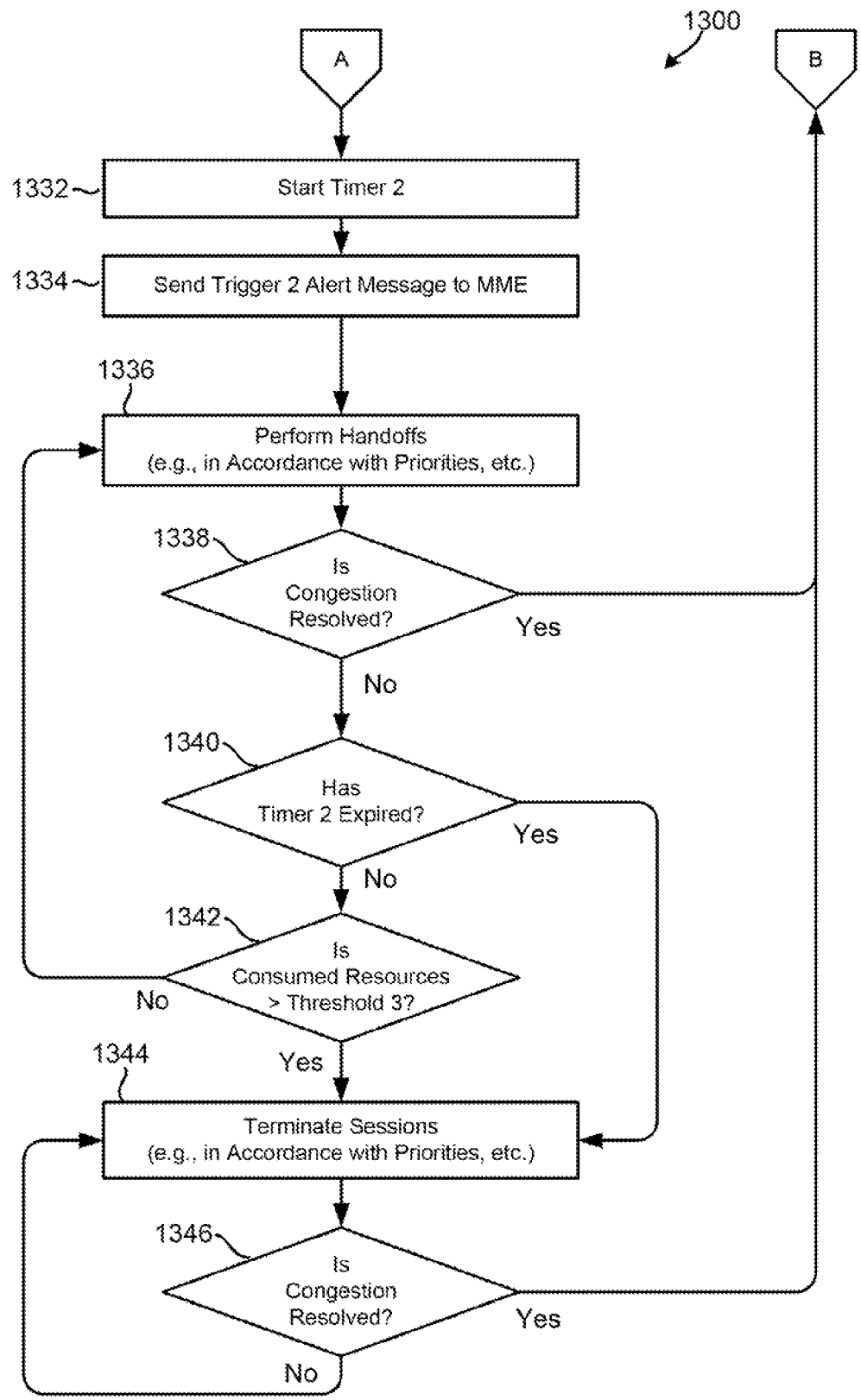

FIGS. 13A and 13B illustrate an embodiment eNodeB method 1300 of shaping network resources based on triggers/threshold values. The operations of method 1300 may be performed by an eNodeB processor, a processor coupled to the eNodeB component, or in a server or agent (e.g., Diameter agent, a specialized server, a software application, a process, a computing system, etc.) in communication with the eNodeB component.

In operation 1302 of method 1300, the eNodeB may monitor resource usage. In an embodiment, the eNodeB may monitor one or more resources (e.g., radio links, resource operations, bandwidth, etc.) in real time as they are allocated by a scheduler (e.g., an eNodeB scheduler, etc.). In determination operation 1304, the eNodeB may determine whether the quantity of resources (e.g., radio links, resource operations, bandwidth, etc.) being utilized exceeds the first threshold value (e.g., a value indicative of the percentage of total available resources, etc.). When the eNodeB determines that the quantity of resources being utilized does not exceed the first threshold value (i.e., determination operation 1304="No"), the eNodeB may continue monitoring resources in operation 1302. When the eNodeB determines that the quantity of resources being utilized exceeds the first threshold value (i.e., determination operation 1304="Yes"), in operation 1306, the eNodeB may set and start a first timer.

In operation 1308, the eNodeB may send a trigger 1 alert message to an MME to notify the MME to restrict transfers, handins, and/or handoffs of mobile devices to the eNodeB. In operation 1310, eNodeB may restrict originations (e.g., session originations, establishment of new communication links, requests for new or additional services, requests for additional bandwidth, etc.). In operations 1308 and 1310, the transfers, handins, handoffs, and/or originations may be restricted based on priorities or rankings of the mobile devices. For example, the eNodeB may restrict originations and handins to/from mobile devices in lower classes or tiers, while allowing originations and handins for higher classes/tiers. As a further example, originations and handins for average civilians may be completely stopped while originations and handins for primary devices operated by first responders or other emergency personal may remain unrestricted.

In various embodiments, the operations of operations 1308 and 1310 may be performed multiple times. That is, although restrictions on handins and originations are applied only once in the example illustrated in FIG. 13, the eNodeB may gradually restrict originations and handins by applying any number of restrictions to any number of different classes or tiers in response to any number of triggers/thresholds.

In an embodiment, as part of operations 1308 and 1310, the eNodeB may wait for a predetermined or variable amount of time after restricting handins and originations for the network congestion to be alleviated or resolved.

In determination operation 1312, the eNodeB may determine whether additional resources have become available and/or the network congestion has otherwise been alleviated or resolved (e.g., resource usage has dropped back under trigger 1 or another acceptable level). When the eNodeB determines that the congestion has been resolved (i.e., determination operation 1312="Yes"), in operation 1316, the eNodeB may send a trigger cancel message to the MME to inform the MME to stop restricting transfers, handins, and handoffs. In operation 1302, the eNodeB may return to monitoring resource usage.

When the eNodeB determines that the congestion has not resolved (i.e., determination operation 1312="No"), in operation 1314, the eNodeB may degrade the local quality of service (QoS) associated with one or more mobile devices, wireless communications links, and/or sessions. In an embodiment, the degradation of the local QoS may be performed by a scheduler (e.g., the eNodeB scheduler). In an embodiment, the local QoS may be degraded based on priorities/rankings (e.g., classes, tiers, etc.) so that the wireless communications links associated with mobile devices in the lowest tiers or classes are degraded first, followed by the wireless communications links to mobile devices in the second lowest tier/class, etc. To ensure that primary users or users in the highest tier always have adequate QoS, in an embodiment, the eNodeB may be configured to not to degrade the local QoS of mobile devices in the higher classes and/or tiers.

In determination operation 1316, the eNodeB may determine whether the congestion has been resolved (e.g., due to the degradation of local QoS of low priority mobile devices, etc.). When the eNodeB determines that the network congestion has been resolved (i.e., determination operation 1316="Yes"), in operation 1322, the eNodeB may restore the local QoS of one or more of the degraded wireless communications links or mobile devices. In an embodiment, the eNodeB may restore the local QoS in the reverse order in which the local QoS was degraded and/or in accordance with the priorities/rankings.

In determination operation 1324, the eNodeB may determine whether there are sufficient network resources available and/or the network congestion remains resolved (e.g., in view of the additional network resources utilized by the restoration of the local QoS of lower priority mobile devices). When the eNodeB determines that there are sufficient network resources available and/or the network congestion remains resolved (i.e., determination operation 1324="Yes"), in operation 1326, the eNodeB may send a trigger cancel message to the MME informing the MME to stop restricting handins, and return to monitoring resources in operation 1302. When the eNodeB determines that the network is congested (i.e., determination operation 1324="No"), in operation 1314, the eNodeB may degrade the local QoS of additional wireless communication links/sessions/mobile devices or undue (or partially undue) the restoration operations performed in operation 1322 for one or more wireless communication links/mobile devices.

In various embodiments, the illustrated operations 1314, 1316, 1322, and 1324 may be performed repeatedly (e.g., when the congestion is relatively close to being resolved) until an optimal level of network resources are allocated to the mobile devices. Repeating operations 1314, 1316, 1322, and 1324 may be desirable to resolve the network congestion via QoS adjustments (as opposed to shedding, termination, and/or handoff operations).

In various embodiments, the eNodeB may be configured to avoid repeatedly performing the operations 1314, 1316, 1322, and 1324 by, for example, identifying the number of iterations through these operations, increasing the quantity by which the local QoS is degraded in operation 1314, decreasing the quantity by which the local QoS is restored in operation 1322, updating parameters used to measure network congestion, etc.

As discussed above, in determination operation 1316, the eNodeB may determine whether the network congestion has been resolved (e.g., due to the degradation of local QoS of low priority mobile devices, availability of additional resources, etc.). When the eNodeB determines that the congestion has not yet been resolved (i.e., determination operation 1316="No"), in determination operation 1318, the eNodeB may determine whether the first timer (i.e., timer 1) has expired. When the eNodeB determines that the first timer (i.e., timer 1) has not expired (i.e., determination operation 1318="No"), in determination operation 1320, the eNodeB may determine whether the quantity of resources being utilized exceeds a second trigger. When the eNodeB determines that consumption of network resources does not exceed the second trigger (i.e., determination operation 1320="No"), in operation 1314, the eNodeB may degrade the local QoS of one or more mobile devices, wireless communication links, sessions, etc.

When the eNodeB determines that the first timer has expired (i.e., determination operation 1318="Yes") or that the resources exceed a second trigger (i.e., determination operation 1320="Yes"), in operation 1332 (illustrated in FIG. 13B), the eNodeB may start a second timer.

With reference to FIG. 13B, in operation 1334, the eNodeB may send a trigger 2 alert message to the MME to indicate to the MME to begin coordinating transfers or handoffs, which may be preformed based on priorities and/or rankings. In operation 1336, the eNodeB may handoff or transfer wireless communication links to mobile devices in the lowest tier or class to a second eNodeB.

In an embodiment, the handoffs may be ranked and/or performed based on the properties of the destination components to which mobile devices are handed off. For example, eNodeB may first attempt to handoff a mobile device to a second eNodeB owned or leased by the same operator, service provider, lessor, etc. When a second eNodeB belonging to the same operator, service provider, lessor, etc. is not available, the eNodeB may handoff the mobile device to a network component affiliated with the lessor, operator, service provider (e.g., to another radio access system with which an operator has a usage agreement), etc. When a network component affiliated with the lessor, operator, service provider is not available, the eNodeB may handoff the mobile device to network component that is owned/operated by a different lessee, operator, service provider, etc.

In determination operation 1338, the eNodeB may determine whether the congestion has been resolved. When the eNodeB determines that the congestion has been resolved (i.e., determination operation 1338="Yes"), in operation 1322, the eNodeB may restore the QoS of one or more of the degraded wireless communications links that have not been handed off. When the eNodeB determines that the congestion has not been resolved (i.e., determination operation 1338="No"), in determination operation 1340, the eNodeB may determine whether the second timer has expired.

When the eNodeB determines that the second timer has not expired (i.e., determination operation 1340="No"), in determination operation 1342, the eNodeB may determine whether the consumption of network resources exceeds a third trigger or threshold value. When the eNodeB determines that the consumption of network resources does not exceed the third trigger/threshold value (i.e., determination operation 1342="No"), in operation 1336, the eNodeB may handoff or transfer additional mobile devices (e.g., in another tier or class) to another eNodeB.

When the eNodeB determines that the second timer has expired (i.e., determination operation 1340="Yes") or that the consumption of network resources exceeds the third trigger/threshold value (i.e., determination operation 1342="Yes"), in operation 1344, the eNodeB may begin terminating wireless communication links or sessions. In an embodiment, the wireless communication links/sessions may be terminated based on priorities or rankings.

As discussed above, the priorities or rankings of connections/mobile devices according to classes/tiers may be used by the eNodeB to determine the sessions that are to be terminated first. For example, the eNodeB may terminate sessions associated with mobile devices in the lowest class/tier before terminating sessions associated with mobile devices in the higher classes/tiers.

In determination operation 1346, the eNodeB may determine whether the network congestion has been resolved. When the eNodeB determines that the congestion is not resolved (i.e., determination operation 1346="No"), in operation 1344, the eNodeB may terminate additional wireless communication links or sessions. When the eNodeB determines that the congestion has been resolved (i.e., determination operation 1346="Yes"), in operation 1322, the eNodeB may restore the QoS of one or more of the degraded wireless communications links or sessions of mobile devices that have not yet been handed off.

FIGS. 14-17 illustrate various embodiment eNodeB methods 1400, 1500, 1600, 1700 of performing TPA and iTPA operations in an eNodeB in accordance with various embodiments. In the examples illustrated in FIGS. 14-17, a mobile device 1452 maintains active data sessions 1402 with a PGW 1460 component, which may be achieved via eNodeB (eNB) 1454, MME 1456, and/or SGW 1458 components, as is described above with reference to FIG. 9A. In addition, the eNodeB 1454 mediates the active data sessions 1402 between mobile device 1452 and the PGW 1460, and performs various radio resource management (RRM) operations (e.g., monitoring the availability of network resources, etc.).

Figure 14:
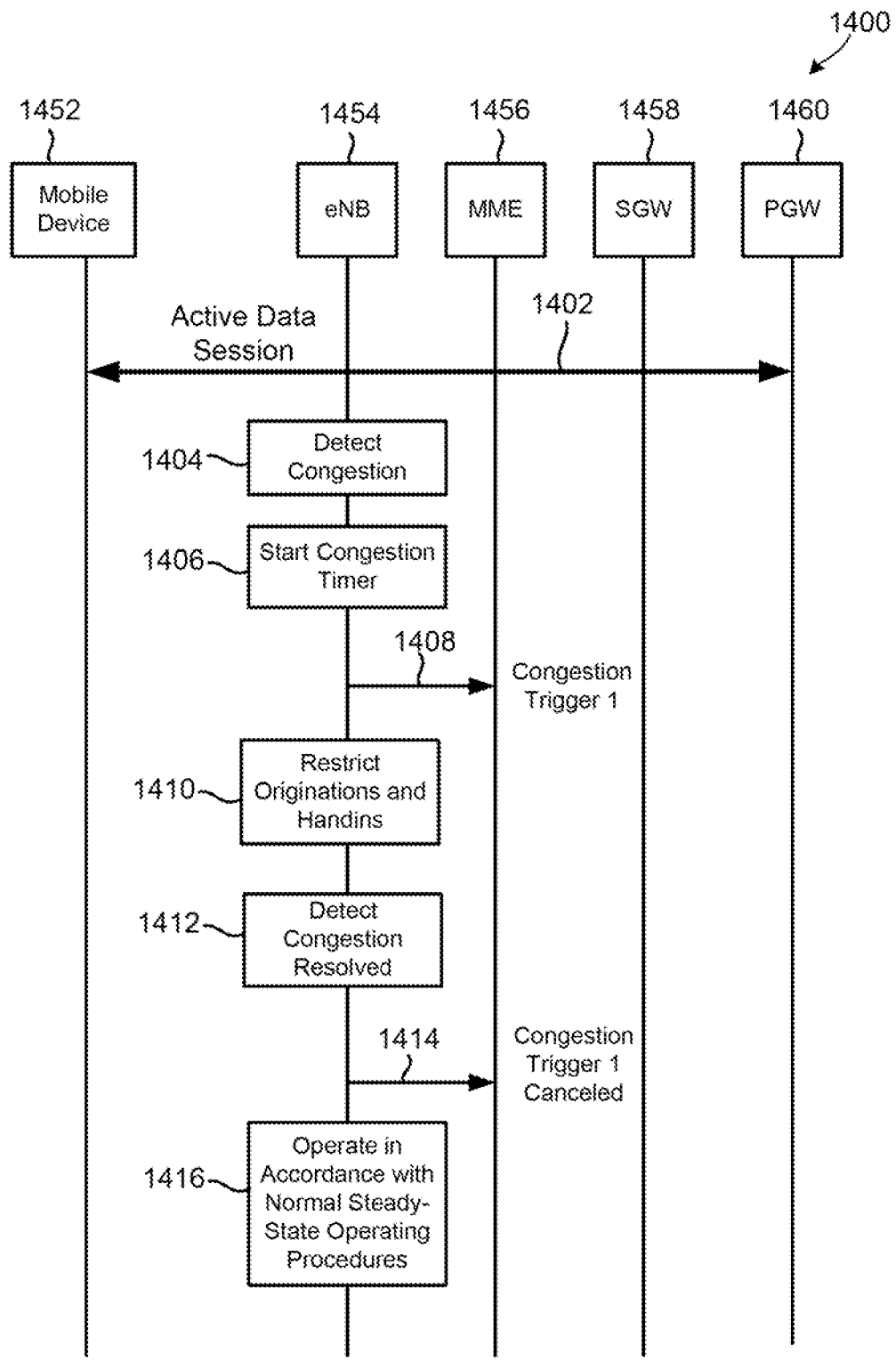
FIG. 14 is a call flow diagram illustrating an example scenario with origination and handin restrictions.

With reference to FIG. 14, in operation 1404 of method 1400, the eNodeB 1454 may determine that the network is congested by, for example, determining whether the quantity of resources being utilized exceeds a threshold value (e.g., a value indicative of the percentage of total available resources, etc.). In operation 1406, the eNodeB 1454 may set and start a congestion timer. In operation 1408, the eNodeB 1454 may send a first congestion trigger alert message to the MME 1456 component to notify the MME 1456 to restrict transfers and/or handoffs of additional mobile devices to the eNodeB 1454. In operation 1410, the eNodeB 1454 may restrict originations (e.g., session originations, establishment of new communication links, requests for new or additional services, requests for additional bandwidth, etc.) and handins (i.e., stop accepting handoffs from other base stations). In operation 1412, the eNodeB 1454 may determine that additional resources have become available and/or the network congestion has otherwise been alleviated or resolved (e.g., resource usage has dropped down to an acceptable level, etc.). In operation 1414, the eNodeB 1454 may send a trigger cancel message to the MME 1456 to inform the MME 1456 to stop restricting transfers and handoffs. In operation 1416, the eNodeB 1454 may return to its normal steady state operating mode.

Figure 15:
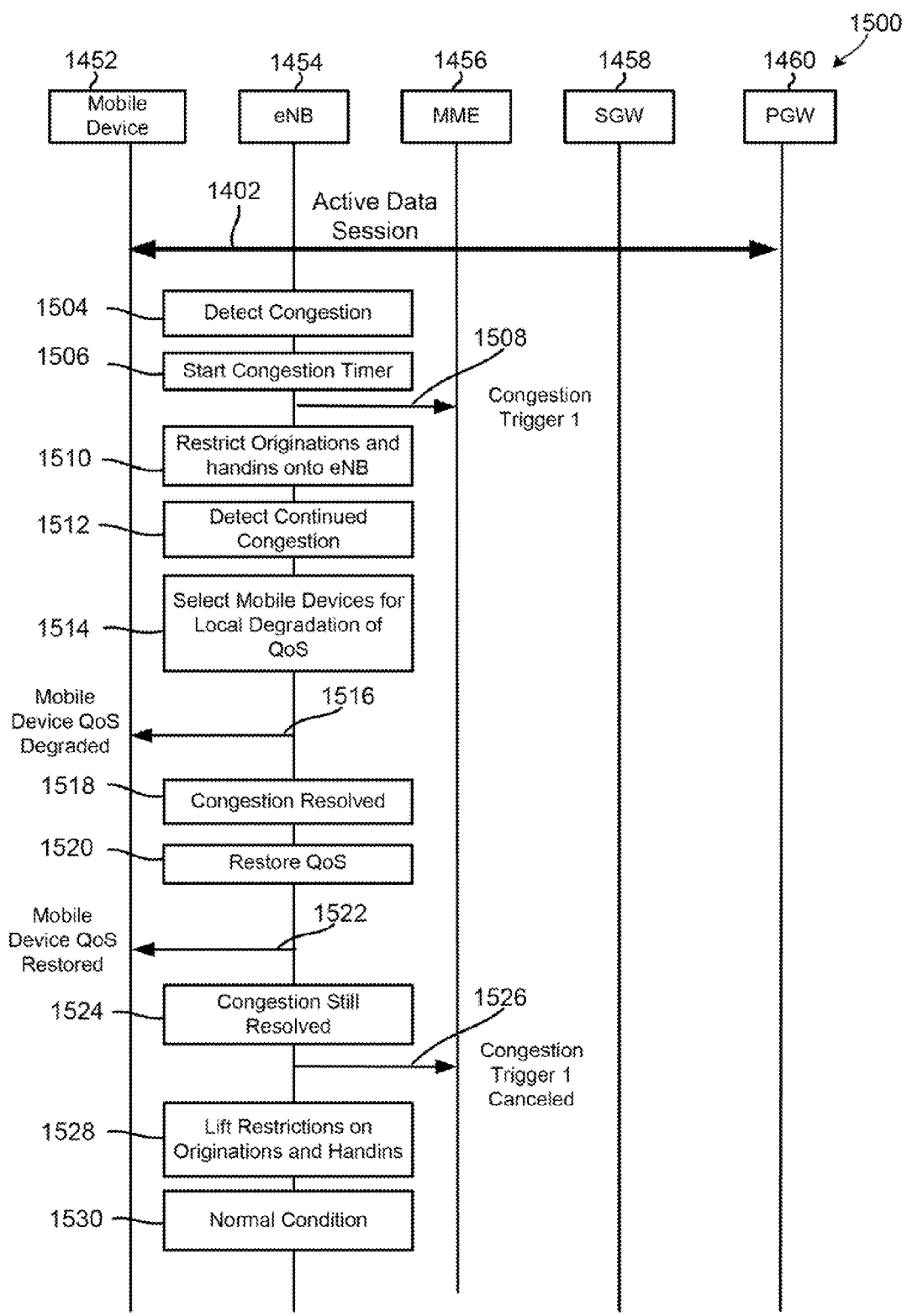
FIG. 15 is a call flow diagram illustrating an example scenario with QoS degradation.

FIG. 15 illustrates an embodiment eNodeB method 1500 for resolving network congestion by degrading the local QoS of one or more mobile devices 1452. In operation 1504 of method 1500, the eNodeB 1454 may determine that the network is congested (e.g., by determining whether the quantity of resources being utilized exceeds a threshold value). In operation 1506, the eNodeB 1454 may set and/or start a congestion timer. In operation 1508, the eNodeB 1454 may send a first congestion trigger alert message to the MME 1456 component to notify the MME 1456 to restrict transfers and/or handoffs of additional mobile devices to the eNodeB 1454. In operation 1510, the eNodeB 1454 may restrict originations and handins. In operation 1512, the eNodeB 1454 may determine that the network congestion has not yet been alleviated or resolved.

In operation 1514, the eNodeB 1454 may select one or more mobile devices 1452 for localized degradation of QoS, which may be performed in accordance to priorities/rankings (e.g., classes, tiers, etc.). In operation 1516, the eNodeB 1454 may degrade the QoS of the selected mobile devices 1452. In operation 1518, the eNodeB 1454 may determine that additional resources have become available and/or the network congestion has otherwise been alleviated or resolved (e.g., resource usage has dropped down to an acceptable level, etc.). In operations 1520-1522, the eNodeB 1454 may restore the local QoS of one or more of the degraded mobile devices 1452. In operation 1524, the eNodeB 1454 may determine that resources are still available and/or the network congestion remains resolved. In operation 1526, the eNodeB 1454 may send a trigger cancel message to the MME 1456 to inform the MME 1456 to stop restricting transfers and handoffs. In operation 1528, the eNodeB 1454 may lift the restrictions on originations and handins. In operation 1530, the eNodeB 1454 and the system may return to normal operating conditions (e.g., steady state operating mode).

Figure 16:
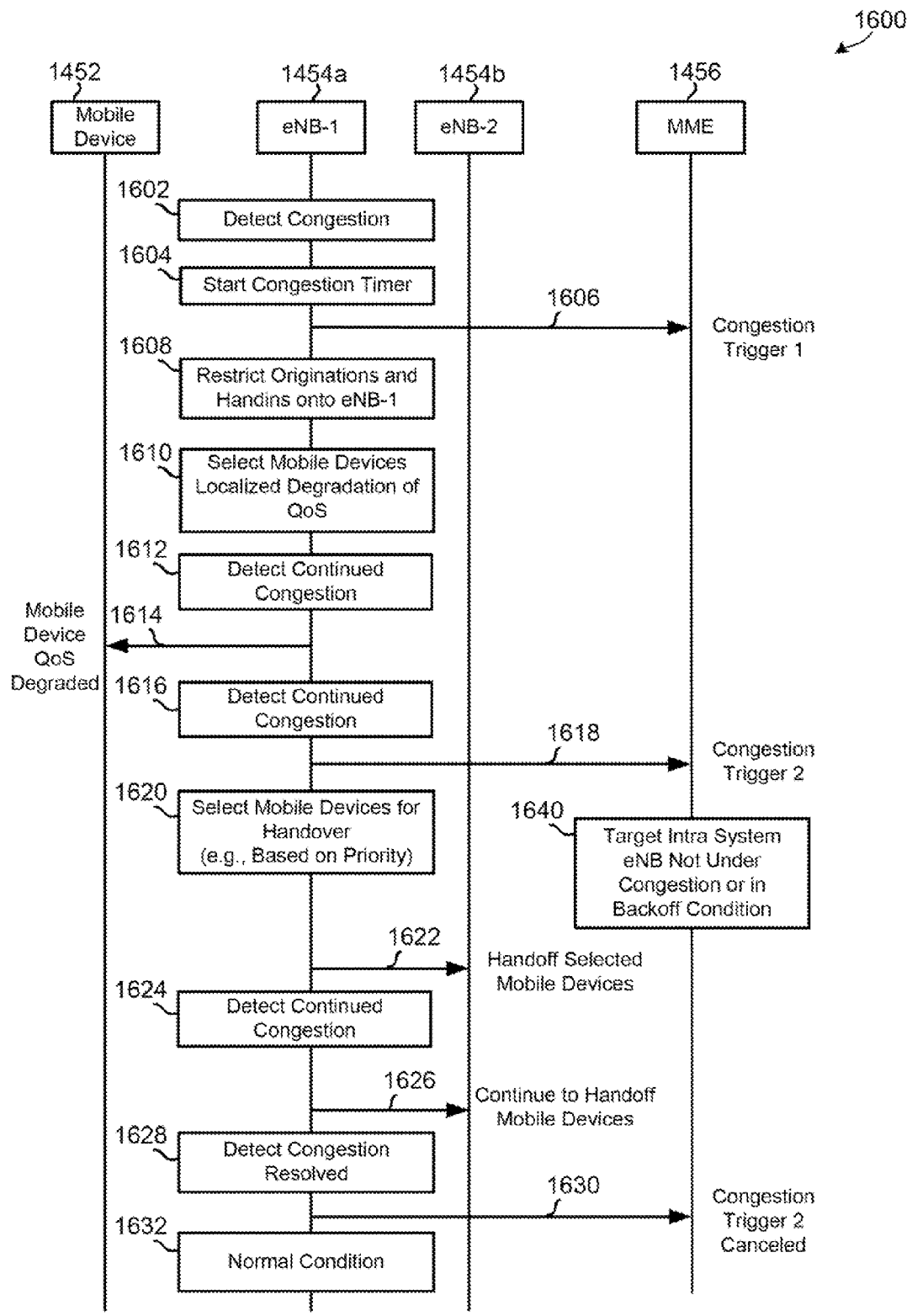
FIG. 16 is a call flow diagram illustrating an example scenario with handoffs.

FIG. 16 illustrates an embodiment method 1600 for resolving network congestion by performing handoff operations to transfer mobile devices to a second base station. In operation 1602, a first eNodeB 1454a may detect network congestion. In operation 1604, the eNodeB 1454a may start a congestion timer. In operation 1606, the eNodeB 1454a may send a first congestion trigger alert message to the MME 1456 component to notify the MME 1456 to restrict transfers and/or handoffs of additional mobile devices to the eNodeB 1454. In operation 1608, the eNodeB 1454a may restrict originations and handins. In operation 1612, the eNodeB 1454a may select one or more mobile devices 1452 for localized degradation of QoS, which may be performed in accordance to priorities/rankings (e.g., classes, tiers, etc.). In operation 1612, the eNodeB 1454a may determine that the network congestion has not yet been alleviated or resolved. In operation 1614, the eNodeB 1454a may degrade the QoS of the selected mobile devices 1452.

In operation 1616, the eNodeB 1454a may determine that the network congestion has not yet been alleviated or resolved (i.e., despite the degradation of the local QoS of one or more mobile devices). In operation 1618, the eNodeB 1454a may send a second trigger alert message to the MME 1456. In operation 1620, the eNodeB 1454a may select one or more mobile devices 1452 for transfer to another base station, which may be performed in accordance to priorities/rankings (e.g., classes, tiers, etc.).

In an embodiment, the selection of mobile devices for handoff may be performed in cooperation/coordination with the MME 1456. For example, in operation 1640, the MME 1456 may identify a second eNodeB (eNB-2) 1454b to which the selected mobile devices may be transferred, which may be performed based on the properties of the destination components to which mobile devices are to be handed off. For example, preference may be given to a second eNodeB that owned or leased by the same operator, service provider, or lessor as the first eNodeB 1454a, followed by an eNodeB affiliated with the same operator, service provider, or lessor (e.g., to another radio access system with which an operator has a usage agreement, etc.). When the eNodeB 1454a and/or MME 1456 determine that a network component owned or affiliated with the lessor, operator, service provider, etc. is not available for transferring a mobile device 1452, the eNodeB 1454*a* and/or MME 1456 may select a network component that is owned/operated by a different lessee, operator, service provider, etc.

In operation 1622 of method 1600, the first eNodeB 1454*a* may handoff one or more selected mobile devices 1452 to a targeted/identified second eNodeB 1454*b*. In operation 1624, the eNodeB 1454*a* may determine that the network congestion has not yet been alleviated or resolved (i.e., despite handing off mobile devices to the second eNodeB 1454*b*). In operation 1626, the first eNodeB 1454*a* may handoff additional mobile devices 1452 to a targeted/identified second eNodeB 1454*b*. In operation 1628, the eNodeB 1454*a* may determine that additional resources have become available and/or the network congestion has otherwise been alleviated or resolved. In operation 1626, the eNodeB 1454 may send a trigger cancel message to the MME 1456. In operation 1632, the eNodeB 1454 and the system may return to normal operating conditions (e.g., steady state operating mode).

Figure 17:
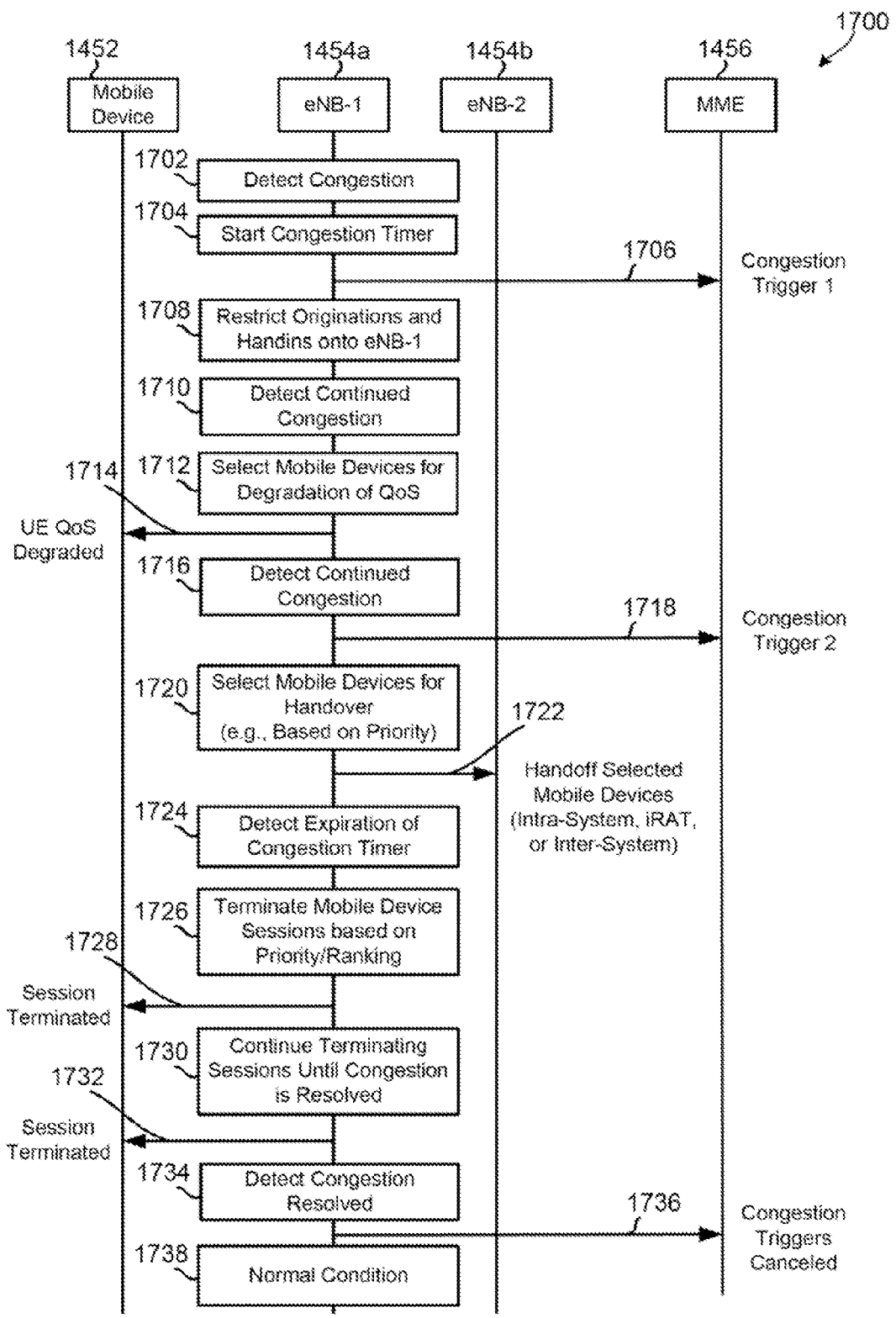
FIG. 17 is a call flow diagram illustrating an example scenario with session termination.

FIG. 17 illustrates an embodiment method 1700 for resolving network congestion by performing traffic shedding operations. In operation 1702, a first eNodeB 1454*a* may detect network congestion. In operation 1704, the eNodeB 1454*a* may start a congestion timer. In operation 1706, the eNodeB 1454*a* may send a first congestion trigger alert message to the MME 1456 component to notify the MME 1456 to restrict transfers and/or handoffs of additional mobile devices to the eNodeB 1454*a*. In operation 1708, the eNodeB 1454*a* may restrict originations and handins. In operation 1710, the eNodeB 1454*a* may determine that the network congestion has not yet been alleviated or resolved (i.e., despite the restrictions on handins, etc.). In operation 1712, the eNodeB 1454*a* may select one or more mobile devices 1452 for localized degradation of QoS, which may be performed in accordance to priorities/rankings (e.g., classes, tiers, etc.). In operation 1714, the eNodeB 1454*a* may degrade the QoS of the selected mobile devices 1452.

In operation 1716, the eNodeB 1454*a* may determine that the network congestion has not yet been alleviated or resolved (i.e., despite the degradation of the local QoS of one or more mobile devices). In operation 1718, the eNodeB 1454*a* may send a second trigger alert message to the MME 1456. In operation 1720, the eNodeB 1454*a* may select one or more mobile devices 1452 for transfer to another base station, which may be performed in accordance to priorities/rankings (e.g., classes, tiers, etc.) and various properties of the mobile devices and/or destination components to which mobile devices are to be handed off.

In operation 1724, the eNodeB 1454*a* may determine that the congestion timer has expired. In operation 1726, the eNodeB 1454*a* may begin terminating mobile device sessions, which may be performed in accordance with priorities/rankings (e.g., classes, tiers, etc.). In the operations represented by reference numeral 1728, one or more sessions of one or more mobile devices 1452 may be terminated.

In operations 1730-1732, the eNodeB 1454*a* may continue terminating mobile device sessions and monitoring the availability of network resources to determine whether the network congestions has been resolved. In operation 1734, the eNodeB 1454*a* may determine that the network congestion has been resolved. In operation 1736, the eNodeB 1454*a* may send a trigger cancellation message to the MME 1456. In operation 1738, the eNodeB 1454 and the system may return to normal operating conditions (e.g., steady state operating mode).

Figure 18:
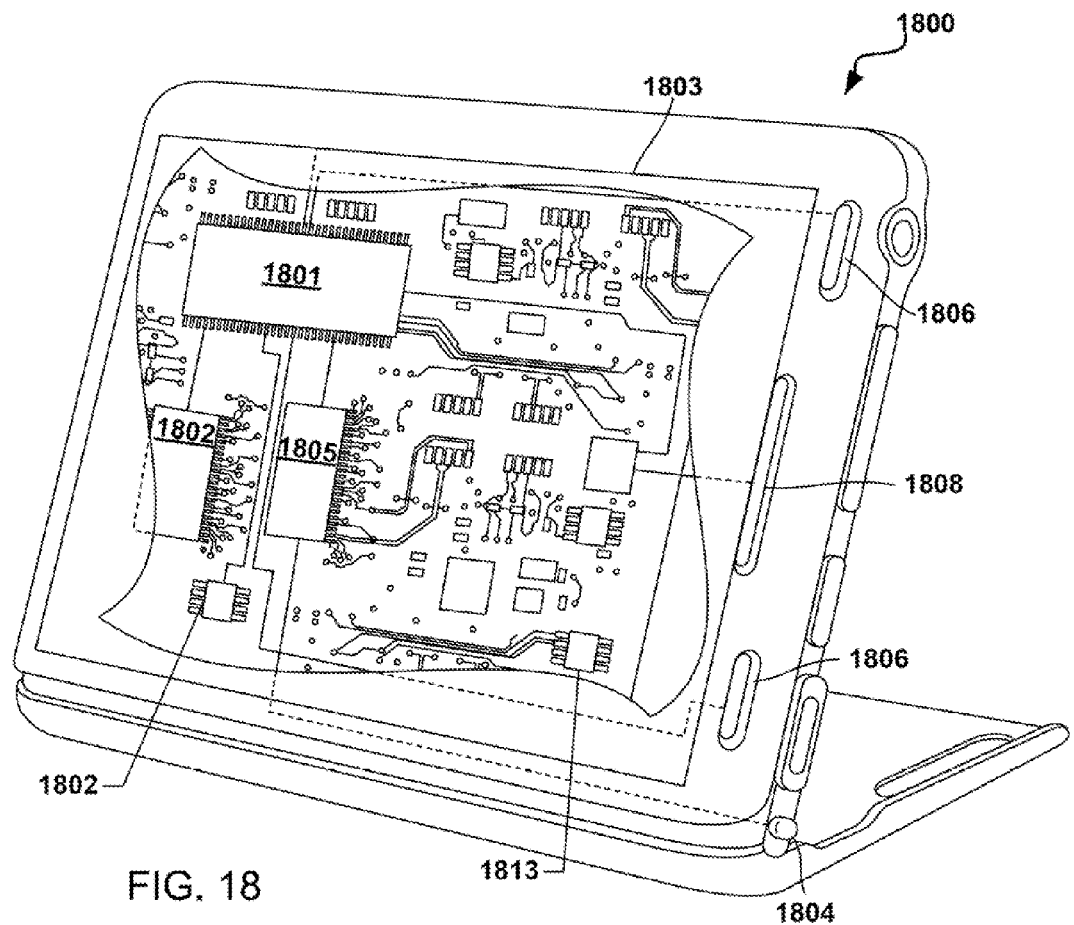
FIG. 18 is a component block diagram of an example mobile device suitable for use with the various aspects.

The various aspects may be implemented on a variety of mobile computing devices, an example of which is illustrated in FIG. 18. Specifically, FIG. 18 is a system block diagram of a mobile transceiver device in the form of a smartphone/cell phone 1800 suitable for use with any of the aspects. The cell phone 1800 may include a processor 1801 coupled to internal memory 1802, a display 1803, and to a speaker 1808. Additionally, the cell phone 1800 may include an antenna 1804 for sending and receiving electromagnetic radiation that may be connected to a wireless data link and/or cellular telephone transceiver 1805 coupled to the processor 1801. Cell phones 1800 typically also include menu selection buttons or rocker switches 1806 for receiving user inputs.

A typical cell phone 1800 also includes a sound encoding/decoding (CODEC) circuit 1813 which digitizes sound received from a microphone into data packets suitable for wireless transmission and decodes received sound data packets to generate analog signals that are provided to the speaker 1808 to generate sound. Also, one or more of the processor 1801, wireless transceiver 1805 and CODEC 1813 may include a digital signal processor (DSP) circuit (not shown separately). The cell phone 1800 may further include a ZigBee transceiver (i.e., an IEEE 802.15.4 transceiver) 1283 for low-power short-range communications between wireless devices, or other similar communication circuitry (e.g., circuitry implementing the Bluetooth® or WiFi protocols, etc.).

Figure 19:
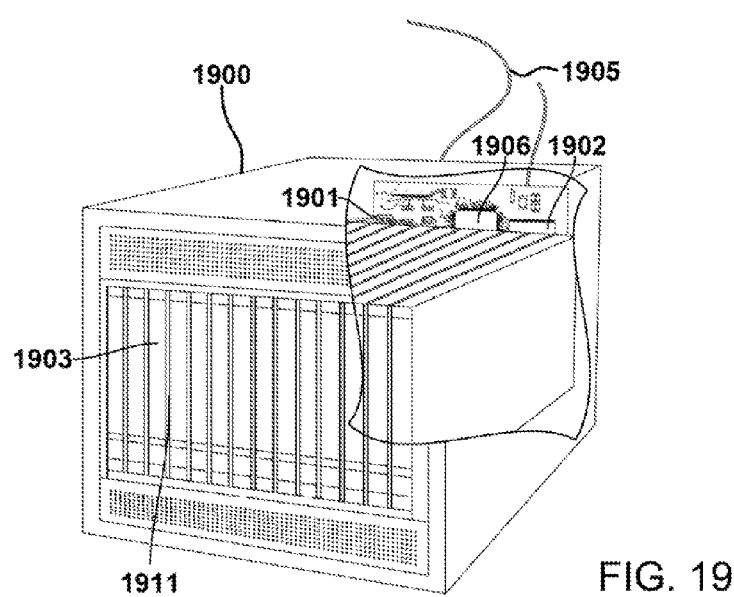
FIG. 19 is a component block diagram of an example server suitable for use with various aspects.

Various aspects may be implemented on any of a variety of commercially available server devices, such as the server 1900 illustrated in FIG. 19. Such a server 1900 typically includes a processor 1901 coupled to volatile memory 1902 and a large capacity nonvolatile memory, such as a disk drive 1903. The server 1900 may also include a floppy disc drive, compact disc (CD) or DVD disc drive 1911 coupled to the processor 1901. The server 1900 may also include network access ports 1906 coupled to the processor 1901 for establishing data connections with a network 1905, such as a local area network coupled to other communication system computers and servers.

The processors 1801, 1901, may be any programmable microprocessor, microcomputer or multiple processor chip or chips that can be configured by software instructions (applications) to perform a variety of functions, including the functions of the various aspects described below. In some mobile devices, multiple processors 1901 may be provided, such as one processor dedicated to wireless communication functions and one processor dedicated to running other applications. Typically, software applications may be stored in the internal memory 1802, 1902, before they are accessed and loaded into the processor 1801, 1901. The processor 1801, 1901 may include internal memory sufficient to store the application software instructions.

The foregoing method descriptions and the process flow diagrams are provided merely as illustrative examples and are not intended to require or imply that the blocks of the various aspects must be performed in the order presented. As will be appreciated by one of skill in the art the order of blocks in the foregoing aspects may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the aspects disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A communication method, comprising:
    monitoring network resource usage in an eNodeB processor of a first eNodeB coupled to a plurality of mobile devices grouped into tiers, each tier being associated with a priority;
    determining in the eNodeB processor whether the usage of the monitored network resources exceeds a first threshold and whether the usage of the monitored network resources exceeds a second threshold;
    restricting originations of new sessions in the coupled mobile devices restricting handins of additional mobile devices to the first eNodeB, and degrading a local quality of service (QoS) of one or more coupled mobile devices based on the priorities associated with the tiers into which the mobile devices are grouped and in response to determining in the eNodeB processor that the usage of the monitored network resources exceeds the first threshold; and
    handing off one or more coupled mobile devices to a second eNodeB based on the priorities associated with the tiers into which the mobile device are grouped in response to determining, in the eNodeB processor of the first eNodeB, that the usage of the monitored network resources exceeds both the first and second thresholds,
    wherein:
        restricting originations of new sessions in the coupled mobile devices comprises restricting originations of new sessions for mobile devices grouped into a tier associated with a low priority; and
        degrading the local QoS of one or more coupled mobile devices based on the priorities associated with the tiers into which the mobile devices are grouped comprises degrading the local QoS for the mobile devices grouped into the tier associated with the low priority.

2. The communication method of claim 1, wherein handing off one or more coupled mobile devices to the second eNodeB further comprises handing off mobile devices based on a network to which the second eNodeB belongs.

3. The communication method of claim 2, wherein handing off mobile devices based on the network to which the second eNodeB belongs comprises:
    determining whether the first eNodeB belongs to a lessor network;
    determining whether the second eNodeB belongs to the lessor network; and
    determining whether the second eNodeB belongs to a radio access system corresponding to the lessor network when it is determined that the second eNodeB does not belong to the lessor network.

4. The communication method of claim 1, further comprising:
    further continuing monitoring network resource usage in the eNodeB processor of the first eNodeB to determine whether the usage of network resources exceeds a third threshold; and
    terminating existing sessions of one or more connected mobile devices when it is determined that the usage of network resources exceeds the third threshold,
    wherein terminating existing sessions of one or more connected mobile devices comprises terminating existing sessions based on the priorities associated with the tiers into which the connected mobile devices are grouped.

5. An eNodeB server, comprising:
a server memory; and
a server processor coupled to the server memory, wherein the server processor is configured with processor-executable instructions to perform operations comprising:
establishing communication links with a telecommunication network;
establishing wireless communication links with a plurality of mobile devices;
grouping the mobile devices into one of a plurality of tiers, each tier being associated with a priority;
monitoring network resource usage on the telecommunication network;
determining whether the usage of the monitored network resources exceeds a first threshold and whether the usage of the monitored network resources exceeds a second threshold;
restricting originations of new sessions in the plurality of mobile devices, restricting handins of additional mobile devices, and degrading a local quality of service (QoS) of one or more of the plurality of mobile devices based on the priorities associated with the tiers into which the mobile devices are grouped and in response to determining that the usage of the monitored network resources exceeds the first threshold; and
handing off one or more of the plurality of mobile devices to a second eNodeB based on the priorities associated with the tiers into which the mobile device are grouped in response to determining, in the eNodeB processor of the first eNodeB, that the usage of the monitored network resources exceeds both the first and second thresholds,
wherein:
restricting originations of new sessions comprises restricting originations of new sessions for mobile devices grouped into a tier associated with a low priority; and
degrading the local QoS of one or more coupled mobile devices based on the priorities associated with the tiers into which the mobile devices are grouped comprises degrading the local QoS for the mobile devices grouped into the tier associated with the low priority.

6. The eNodeB server of claim 5, wherein the server processor is configured with processor-executable instructions to perform operations such that handing off one or more coupled mobile devices to the second eNodeB further comprises handing off mobile devices based on a network to which the second eNodeB belongs.

7. The eNodeB server of claim 6, wherein the server processor is configured with processor-executable instructions to perform operations such that handing off mobile devices based on a network to which the second eNodeB belongs comprises:
determining whether the eNodeB server belongs to a lessor network;
determining whether the second eNodeB belongs to the lessor network; and
determining whether the second eNodeB belongs to a radio access system corresponding to the lessor network when it is determined that the second eNodeB does not belong to the lessor network.

8. The eNodeB server of claim 5, wherein the server processor is configured with processor-executable instructions to perform operations further comprising:
further continuing monitoring network resource usage to determine whether the usage of network resources exceeds a third threshold; and
terminating existing sessions of one or more mobile devices when it is determined that the usage of network resources exceeds the third threshold,
wherein terminating existing sessions of one or more mobile devices comprises terminating existing sessions based on the priorities associated with the tiers into which the connected mobile devices are grouped.

9. A non-transitory computer readable storage medium having stored thereon processor-executable software instructions configured to cause a processor to perform operations for relaying communications between a plurality of mobile devices and a telecommunication network, the operations comprising:
establishing communication links with the telecommunication network;
establishing wireless communication links with the plurality of mobile devices;
grouping each of mobile devices into one of a plurality of tiers, each tier being associated with a priority;
monitoring network resource usage of the telecommunication network;
determining whether the usage of the monitored network resources exceeds a first threshold and whether the usage of the monitored network resources exceeds a second threshold;
restricting originations of new sessions in the plurality of mobile devices, restricting handins of additional mobile devices, and degrading a local quality of service (QoS) of one or more of the plurality of mobile devices based on the priorities associated with the tiers into which the mobile devices are grouped when it is determined that the usage of network resources exceeds the first threshold; and
handing off one or more of the plurality of mobile devices to a second eNodeB based on the priorities associated with the tiers into which the mobile device are grouped in response to determining, in the eNodeB processor of the first eNodeB, that the usage of the monitored network resources exceeds both the first and second thresholds,
wherein:
restricting originations of new sessions comprises restricting originations of new sessions for mobile devices grouped into a tier associated with a low priority; and
degrading the local QoS of one or more of the plurality of mobile devices based on the priorities associated with the tiers into which the mobile devices are grouped comprises degrading the local QoS for the mobile devices grouped into the tier associated with the low priority.

10. The non-transitory computer readable storage medium of claim 9, wherein the stored processor-executable software instructions are configured to cause a processor to perform operations such that handing off one or more coupled mobile devices to the eNodeB further comprises handing off mobile devices based on the network to which the eNodeB belongs.

11. The non-transitory computer readable storage medium of claim 10, wherein the stored processor-executable software instructions are configured to cause a processor to perform operations such that handing off mobile devices based on a network to which the eNodeB belongs comprises:

identifying a lessor network;
determining whether the second eNodeB belongs to the lessor network; and
determining whether the second eNodeB belongs to a radio access system corresponding to the lessor network when it is determined that the second eNodeB does not belong to the lessor network.

12. The non-transitory computer readable storage medium of claim 9, wherein the stored processor-executable software instructions are configured to cause a processor to perform operations comprising:
further continuing monitoring network resource usage to determine whether the usage of network resources exceeds a third threshold; and
terminating existing sessions of one or more connected mobile devices when it is determined that the usage of network resources exceeds the third threshold,
wherein terminating existing sessions of one or more connected mobile devices comprises terminating existing sessions based on the priorities associated with the tiers into which the connected mobile devices are grouped.

* * * * *